US005536583A

United States Patent [19]
Roberts et al.

[11] Patent Number: 5,536,583
[45] Date of Patent: Jul. 16, 1996

[54] POLYMER METAL BONDED COMPOSITE AND METHOD OF PRODUCING SAME

[75] Inventors: Robert Roberts; Steven E. Rau; Kevin P. Pochopien, all of Newark, Del.; Harris L. Morris, Lima, Pa.

[73] Assignee: Edlon Products, Inc., Avondale, Pa.

[21] Appl. No.: 119,325

[22] Filed: Sep. 9, 1993

Related U.S. Application Data

[63] Continuation of Ser. No. 459,730, Feb. 28, 1990, abandoned, which is a continuation-in-part of Ser. No. 68,432, Jun. 30, 1987, Pat. No. 4,897,439, which is a continuation-in-part of Ser. No. 881,371, Jul. 1, 1986, abandoned.

[51] Int. Cl.$^6$ ............................. B32B 15/04; B32B 15/08
[52] U.S. Cl. ........................... 428/457; 428/626; 524/443
[58] Field of Search ...................................... 428/457, 626

[56] References Cited

U.S. PATENT DOCUMENTS

| | | | |
|---|---|---|---|
| 2,732,357 | 1/1956 | Sprung | 524/544 X |
| 2,954,359 | 9/1960 | Robb et al. | 260/41 |
| 3,531,432 | 9/1970 | Graver | 260/41 |
| 3,556,161 | 6/1971 | Roberts | 138/141 |
| 3,769,252 | 10/1973 | Fujii et al. | 260/328 R |
| 3,824,115 | 7/1974 | Segawa et al. | 427/201 |
| 3,856,736 | 12/1974 | Tieszen et al. | 525/189 X |
| 3,904,575 | 9/1975 | Satokawa | 260/328 R |
| 3,920,793 | 11/1975 | Teti et al. | 428/215 |
| 3,970,627 | 7/1976 | Seymus | 524/546 |
| 3,981,945 | 9/1976 | Attwood et al. | 525/189 |
| 3,989,873 | 11/1976 | Robertson et al. | 428/422 |
| 4,051,275 | 9/1977 | Forestek | 427/201 |
| 4,064,963 | 12/1977 | Kaan et al. | 181/244 |
| 4,090,993 | 5/1978 | Attwood et al. | 524/171 |
| 4,154,876 | 5/1979 | Segawa et al. | 427/195 |
| 4,166,536 | 9/1979 | Roberts et al. | 206/524.3 |
| 4,199,628 | 4/1980 | Caines | 428/36 |
| 4,248,763 | 2/1981 | Yoshimura et al. | 524/83 |
| 4,252,859 | 2/1981 | Concannon et al. | 428/422 |
| 4,258,089 | 3/1981 | Anderson et al. | 427/318 |
| 4,259,389 | 3/1981 | Vine et al. | 428/192 |
| 4,425,448 | 1/1984 | Concannon et al. | 524/443 |
| 4,478,965 | 10/1984 | Concannon et al. | 524/443 |
| 4,578,427 | 3/1986 | Saito et al. | 525/150 |
| 4,605,695 | 8/1986 | Sakamaki et al. | 524/424 |
| 4,613,645 | 9/1986 | Robeson et al. | 524/443 |
| 4,690,972 | 9/1987 | Johnson et al. | 524/609 |
| 4,758,277 | 7/1988 | Spruegel et al. | 106/36 |
| 4,897,439 | 1/1990 | Rau et al. | 524/404 |
| 5,093,403 | 3/1992 | Rau et al. | 524/404 |

FOREIGN PATENT DOCUMENTS

| | | | |
|---|---|---|---|
| 0010152 | 4/1980 | European Pat. Off. | C08L 27/18 |
| 55-127462 | 10/1980 | Japan | C08L 79/08 |
| 57-195149 | 11/1982 | Japan . | |
| 2051091 | 9/1983 | United Kingdom . | |
| 8900175 | 1/1989 | WIPO | C08L 27/12 |

OTHER PUBLICATIONS

Nara et al., "Gas Seals for Phosphoric Acid Fuel Cell", Chemical Abstracts 106, 87704m (1987).
Sakai et al., "Fuel Cell", Chemical Abstracts 107, 62009W (1987).
Hanselka et al., "Materials of Construction for Water Systems Part 1: Physical & Chemical Properties of Plastics", in Ultrapure Water Journal (Jul./Aug. 1987).
DuPont Publication, "Properties Handbook of Teflon PFA Resins for Design Engineers", (date unknown).
Zanizdra et al., "Poly(tetrafluoroethylene) Compositions for Bushings", Chemical Abstracts 69, 36812e (1968).
Segawa et al., "Fuel Cell", Chemical Abstracts 104, 152521z (1986).

*Primary Examiner*—Joseph L. Schofer
*Assistant Examiner*—Wu C. Cheng
*Attorney, Agent, or Firm*—Synnestvedt & Lechner

[57] ABSTRACT

A coating composition including a polyether resin and comprising a major amount of resin and a minor amount of a property-improving additive, said resin being:

(A) a fluorocarbon resin selected from the group consisting of (1) perfluoroalkoxy tetrafluoroethylene copolymer resin (PFA), (2) ethylenechlorotrifluoroethylene copolymer resin (E-CTFE), (3) ethylenetetrafluoroethylene copolymer resin (E-TFE), (4) poly(vinylidine fluoride) resin (PVDF), (5) tetrafluoroethylene-hexafluoropropylene copolymer resin (FEP), (6) poly(chlorotrifluoroethylene) resin (CTFE), or a mixture of two or more of said fluorocarbon resins; and/or (B) a polyether resin selected from the group consisting of (7) polyethersulfone resin (PES), (8) polyether ketone resin (PEK) and (9) polyether ether ketone resin (PEEK) or a mixture or two or more of said polyether resins;

said additive being:

(C) a poly(phenylene sulfide) (PPS); or (D) an inorganic crystalline ceramic powder and/or fluorocarbon resin when said resin is a polyether of (B) above; or (E) an inorganic material selected from the group consisting of a nitride, an oxide, a diboride, and a carbide of silicon, of zirconium, of tungsten or of boron, and/or a polyether when said resin is a fluorocarbon of (A) above;

Coatings and articles including a fused form of said composition and a method for forming said fused composition.

25 Claims, No Drawings

POLYMER METAL BONDED COMPOSITE AND METHOD OF PRODUCING SAME

CROSS-REFERENCE TO RELATED APPLICATIONS

This is a Continuation application of application Ser. No. 07/459,730, filed Feb. 28, 1990, now abandoned which is a continuation-in-part of U.S. application Ser. No. 07/68,432, filed Jun. 30, 1987, now U.S. Pat. No. 4,897,439, which is a continuation-in-part of U.S. application Ser. No. 06/881,371, filed Jul. 1, 1986, now abandoned.

FIELD OF THE INVENTION

This invention relates generally to the field of bonding polymeric materials to metal materials and particularly to bonding fluorinated polymers and polyether resins to metals, including ferrous-based metals.

REPORTED DEVELOPMENTS

In the chemical processing industry, as well as many other industries, a variety of composite materials are used to fabricate apparatus used therein. In many instances, metals are used to provide the structural strength for such apparatus. However, such apparatus, many times, is required to be exposed to highly corrosive materials which are being processed; some of this exposure is at elevated temperatures and/or elevated pressures which tend to exaggerate the corrosive properties of the materials being processed. It has been found necessary, in many applications, to protect the metals used in such apparatus from the effects of corrosion, under varying conditions of temperature and pressure, particularly at elevated temperatures, and at increased pressures.

The approach, generally, to this problem has been to shield the structural metals from corrosive materials. This is done by forming a composite by superimposing other materials onto those surfaces of the structural metals which would otherwise be exposed to corrosive attack, the concept being to only permit contact of corrosive materials to barrier materials which will resist the effects of such corrosion which are formed on the surfaces of underlying or substrate structural metals. Of course, such overlayed or barrier materials are selected to have relatively little, or ideally no, reaction to those materials which otherwise corrosively attack the substrate structural metals.

One concept of protecting structural metals from corrosive attack is to bond a glass coating to those surfaces of the substrate structural metal which are to be exposed to materials which would corrode those structural metals if contact were permitted. This concept has been used for many years and is quite satisfactory where substantially no flexing of the structural metal is possible. If flexing is a possibility, glass-metal composites may encounter problems as the glass overlay, or barrier coating, of the composite may tend to crack, thus providing an avenue for corrosive material to reach the base substrate structural material. Also, glass coated metal materials tend to be highly susceptible to mechanical damage. Finally, glass, being an amorphous material, is not resistant to corrosive attack by various common chemicals.

Another concept has been to overlay, or form a barrier coating, of relatively thin sheets of non-corrosive metals, such as titanium, tantalum, hafnium, etc. onto structural base metals, for example, mild 0.25% carbon low carbon steel. This concept requires the bonding of very expensive overlay, or barrier coat, metals onto other dissimilar structural base metals. Not only are the overlay, or barrier coat, metals expensive, but the process of bonding, usually requiring extensive and complicated welding techniques, is very expensive. Nevertheless, this concept is commercially used where the apparatus is to be exposed to a combination of extreme corrosion and extremely elevated temperatures and where extreme temperature differentials, which occur rapidly, are to be encountered.

A third concept has been to apply a polymer to the surface of the structural metal, the polymer being bonded to the surface of the structural metal. This concept has had some success where the corrosive effects of the corrosive materials are relatively mild and where the elevated temperatures to be experienced are modest, being below the heat degradation points of the polymers used. Also, this concept has been used where anti-sticking properties are important, such as in roll coverings used in dryer rollers, carrier rollers, etc.

In an attempt to overcome some of the limitations of most polymers, in respect to corrosive resistance and to limitations on range of elevated temperature use, fluorinated polymers have been used as overlays, or barrier coats, on base structural materials. As is well known, fluorinated polymers exhibit relatively high corrosion-resistance in comparison to other polymers. Also, fluorinated polymers have a relatively high operating temperature point of degradation, in comparison to other polymers. Finally, fluorinated polymers, as well as other polymers are relatively much more flexible in comparison to glass, and are essentially inert to most common chemicals up to the melting point of such fluorinated polymers.

In developing polymeric barrier coatings as applied onto metals, a true composite is formed only where the materials are bonded together with high integrity bonds. This is to say that the resin used, which is in contact with the metal substrate, should be as firmly bonded to that metal as possible.

It is also necessary that microvoids (porosity) of the coating be essentially eliminated if the polymer barrier coating of the composite is to be utilized to prevent corrosion of the underlying substrate metal.

All polymeric barrier coatings, to one extent or another, are subject to molecular permeation by gaseous chemicals. Permeant flow is accelerated by elevated temperatures and by increased pressure. This phenomenon exists because it is virtually impossible to remove all of the voids (porosity) in the coating. However, the fewer voids, the less the permeation. The permeation, of course, is not detrimental to the resin itself because, hopefully, the polymer selected for the barrier coat is chosen because of its inertness in respect to corrosive attack by a particular chemical or set of chemicals. However, the barrier coat is necessary, in the first place, because the chemical or chemicals in question do corrosively attack the underlying substrate metal, while the barrier coat should impede this process.

If the bonding of the resin to the substrate metal is not complete, that is, if a substantial percentage of the resin is not completely bonded to the adjacent metal surface, the metal at those points is open to attack by the permeants. Generally, the substrate metal, particularly in the form of vessel walls, is non-isothermal with respect to the thermal condition of the corrosive medium, which, in the case of vessels, comprises the contents thereof. Thus, the metal surface acts as a heat sink, and the permeants tend to condense and collect on those portions of the colder metal surface to which the resin is not bonded. When this occurs, the corrosive substance causes not only deterioration of the exposed metal, but also deterioration of the adjacent metal underneath the metal-resin particle bonds that do exist. The result may be that the existing bonds are destroyed and delamination occurs. This phenomenon can show upon the surface of the barrier coat as blisters. Such blisters may be caused by gas and/or liquid build up, beneath the barrier coat, where the barrier coat has begun to become delaminated. These blisters indicate that the metal substrate underneath the blisters is suffering corrosive attack. Of course, the corrosive attack to the substrate metal frequently creates discoloration of that metal as salts and oxides are formed. This discoloration, or blanching, as well as blistering, are visually detectable on the barrier coat surface as the underlying corrosion becomes pervasive.

On the other hand, the more resin bonded to the metal, the less metal substrate surface area there is exposed to the permeants. Therefore, the less condensation there is which occurs on the metal. Also, the fewer voids there are within the barrier coating, the less opportunity for the permeants, gaseous or otherwise, to get through the barrier coating to the substrate metal.

In addition to increasing the integrity of bonding of the resin to the substrate metal, thus decreasing voids and decreasing metal surface available to attack, another approach is considered desirable. This is basically to increase the thickness of the barrier coat itself, the theory being that this will hinder permeation because, simply, the permeants have a greater distance to travel, and the possibility of tortuous pathways, through interconnected voids, being blocked by resin is increased because there is more resin between the barrier coat surface and the underlying metal substrate surface.

Fluoropolymers are well known for their inert characteristics in respect to a wide variety of different chemicals. In addition, fluoropolymers are well known for their high temperature capabilities relative to other polymers. Therefore, fluoropolymers are primary candidate materials for chemical barrier coatings.

On the other hand, fluoropolymers characteristically are very long chain, high molecular weight, high melt viscosity polymers with a narrow temperature range, relative to most other polymers, between melt and degradation. Fluoropolymers are also very poor conductors of heat, complicating the approach to developing heat input to induce melting, thus producing void free barrier coatings. The combination of these factors makes processing of fluoropolymers difficult, if not impractical, under many circumstances. Therefore, although fluoropolymers may be primary candidate materials for chemical barrier coatings, they are difficult to process and apply, which in many circumstances substantially diminishes this candidacy.

As implied above, it is known in the art that the chemical permeability of barrier coatings varies inversely with the thickness of that barrier coating. However, it is quite difficult to form relatively thick coatings of fluoropolymers because of their inherent high viscosities which result in low melt flow and slow fusion characteristics. To bond the particles of fluoropolymer resin to each other and to underlying substrate materials, the particles must be brought to above melt temperature but kept below the practical degradation temperature. Inability to control this process may result in entrapment of air between particles, ultimately resulting in the formation of bubbles in the barrier coating. It is very difficult to control this process when such coatings are applied to relatively large or complex metal shapes, as it is difficult to control the temperature of each discrete point of such pieces within a narrow range such that each discrete point is above the melt point of the fluorinated polymer being applied but not above the practical degradation point. Also, it must be ensured that the surrounding atmosphere, adjacent to the exposed face of the barrier coat being applied is, likewise, within the narrow practical range of temperature. And finally, all particles of the fluorinated polymer across the thickness of the coating must, likewise, be within that narrow practical temperature range, notwithstanding the fact that fluorinated polymers are notorious for poor heat transfer.

Attempts have been made to build up series of thin coats of fluorinated polymers, as barrier coatings, overlaying one on another, and using a heating cycle in between each thin layer to bond it to the previous layer. In commercial applications, as are well known, the powdered polymer resin particles are suspended in a carrier fluid, usually water, and sprayed in a thin layer, onto the substrate metal, followed by a heating step. This is followed by a repeat of the cycle, many times, each time laying down a 0.001" to 0,010" thick layer. This method has encountered difficulties as small quantities of the carrier fluid tend to remain trapped within the lattice formed by the powdered resin particles. On heating, the carrier fluid vaporizes and expands, which can separate the layers from one another and may prevent bonding. This can appear as surface bubbles. However, even when each sprayed layer is carefully dried, acceptable bonding may not occur between the thin layers of the barrier coating; the reason for this is not clear.

Also, there are major problems in developing and maintaining a uniform suspension of fluorinated polymer resin particles in the carrier fluids. A variety of additives in the form of surfactants, antifoaming agents and other "wetting aids" and "processing aids" are used in an attempt to overcome these problems. It is believed that these additives hinder the bonding of successively built up thin layers of the polymers to each other, even in situations where no bubbling occurs between such layers.

More recently, attempts have been made to apply dry powdered fluorinated polymer resins to metal substrates using electrostatic deposition, floccing and fluidized bed techniques. Although coatings in excess of 0,012" thickness have been accomplished, attempts to form coatings up to 0,040" thickness have failed due to the formation of bubbles and voids during the heating stage, regardless of whether a single thick layer is applied or multiple thin layers, interspersed with heating steps, are attempted. The cause of such failures is not clear.

The following publications disclose coatings comprising fluorocarbon polymers: U.S. Pat. Nos. 4,064,963 and 4,605,695; U.K. Patent No. 2,051,091, and EPO Publication No. 10152.

The major problem in using fluorinated polymers as an overlay, or barrier coat, in composites with substrate metals, is that it is difficult to produce high integrity bonding of the fluorinated polymers to the base structural metals. One composite of fluorinated polymer, overlayed as a barrier coating onto steels, has been successfully marketed, under the trade name Fluoroshield, by W. L. Gore and Associates, Inc. This composite is believed to be detailed in British Patent No. 2,051,091. Fluoroshield coated metals, however, as will be later specifically detailed, do not appear to exhibit the long-term bonding integrity or chemical resistance which is deemed necessary, by those with skill in the field, to ensure the extended higher temperature corrosion-resistance necessary for reliable use in chemical processing equipment.

SUMMARY OF THE INVENTION

In accordance with one aspect of the present invention, there is provided a substrate coated with a corrosion-resistant resinous coating formed by fusing a coating composition including a polyether resin and comprising a major amount of resin and a minor amount of a property-improving additive, said resin being:

(A) a fluorocarbon resin selected from the group consisting of (1) perfluoroalkoxy tetrafluoroethylene copolymer resin (PFA), (2) ethylenechlorotrifluoroethylene copolymer resin (E-CTFE), (3) ethylenetetrafluoroethylene copolymer resin (E-TFE), (4) poly(vinylidine fluoride) resin (PVDF), (5) tetrafluoroethylene-hexafluoropropylene copolymer resin (FEP), (6) poly(chlorotrifluoroethylene) resin (CTFE), or a mixture of two or more of said fluorocarbon resins; and/or (B) a polyether resin selected from the group consisting of (7) polyethersulfone resin (PES), (8) polyether ketone resin (PEK) and (9) polyether ether ketone resin (PEEK) or a mixture of two or more of said polyether resins;

said additive being:

(C) a poly(phenylene sulfide) (PPS); or (D) an inorganic crystalline ceramic powder and/or fluorocarbon resin when said resin is a polyether of (B) above; or (E) an inoganic material selected from the group consisting of a nitride, an oxide, a diboride, and a carbide of silicon, of zirconium, of tungsten or of boron, and/or a polyether when said resin is a fluorocarbon of (A) above.

Another aspect of the present invention is the provision of a coating composition which is capable of being fused, that is, melted at elevated temperature and then cooled to form the aforementioned corrosion-resistant resinous coating. The present invention encompasses within its scope coating compositions in which the resin constituent is present in a major amount in the form of a mixture of resins (A) and/or (B) above combined with a minor amount of the property-improving additive. In addition, the composition includes within its scope the use of a mixture of additives, for example, a mixture of two or more of the additives of (C), (D) and (E) above, and, within the group of additives of (E) above, a mixture of two or more of such additives.

Speaking generally, the property-improving additive can be selected to improve various properties of coatings formed from the composition of the present invention, for example, properties such as corrosion-resistance, abrasion-resistance, and/or bonding characteristics.

The preferred property-improving additive is a metal carbide, most preferably silicon carbide or zirconium carbide or a mixture of such carbides, and, for use with fluorocarbon resins, also PEEK.

It is expected that the invention will be used most widely in connection with forming coatings on metallic surfaces, particularly iron substrates. However, non-metallic surfaces can be coated also with a composition of the present invention.

The present invention encompasses also a method for forming a coating from the composition of the present invention, including process means for the application of such a composition to an underlying substrate.

DETAILED DESCRIPTION OF THE INVENTION

The present invention includes a composite of a polymer barrier coating which is highly integrally bonded to a substrate metal surface, the coating exhibiting substantially fewer voids and improved resistance to corrosion and abrasion. Thus, given a certain thickness of the barrier coating of the present invention, in comparison with an equal thickness of barrier coatings found in the prior art, the present invention is responsible for effecting substantially decreased corrosive attack to the underlying metal substrate at elevated temperatures and/or pressures over a prolonged period of time. The present invention also provides a method of producing such a composite as well as a formulation, the use of which will produce the barrier coatings, sheets and shaped articles of the present invention.

As will be described in greater detail below, the additive-containing polymer compositions of the present invention may be divided for convenience into three groups based upon the uses to which they are put: primer coatings, barrier coatings, and abrasion/wear resistant functional coatings.

Primer coatings bond very strongly to the underlying metal substrate and themselves provide a substrate to which coatings having other properties may be strongly bonded. In applications where improved bonding of a protective resin overlay is sought, the coating composition may be applied as a "primer coating" to the underlying metal substrate.

Barrier coatings provide a barrier between the substrate to which they are bonded and a corrosive environment. In applications where improved corrosion-resistance of a protective resin overlay is sought, the coating composition may be applied directly to the metal substrate or over a previously applied resin coat, for example, over a primer undercoat.

In certain instances, there may be an overlap in the use to which a given composition may be put, that is, certain of the compositions bond strongly to a metal substrate and at the same time provide a superior barrier to chemical attack. In addition, as a general rule, polymer compositions of the present invention which bond most strongly to the substrate are useful also as abrasion-resistant coatings applied directly to the substrate or over other polymer coats.

Accordingly, in applications where improved abrasion-resistance of the coating is sought, the coating composition may be applied as an outermost layer over previously applied resin layers or in direct contact with the metal substrate.

Compositions useful particularly for forming primer coatings include (1) a fluorocarbon resin of (A) above in admixture with an additive of (C) and/or (E) above and (2) a polyether resin of (B) above in admixture with fluorocarbon resin, preferably a resin of (A) above, and/or a ceramic powder of (D) above.

Compositions useful particularly for forming a corrosion-resistant barrier coating include a fluorocarbon resin of (A) above in admixture with an additive of (E) above.

Compositions useful particularly for forming abrasion- and wear-resistant surfaces or top coatings include a fluorocarbon and/or polyether resin of (A) and (B) above respectively in admixture with a non-resin additive as identified in (D) and (E) above.

The fluorocarbon resins and polyether resins of (A) and of (B) above are known classes of resins. Species of such resins are available commercially.

The fluorocarbon and polyether resins of (A) and (B) above are used in the practice of the present invention in fine particle size form. It is recommended that the particle size of the resins be about 1 to about 200 microns, preferably about 20 to about 120 microns.

As mentioned above, PFA is a preferred fluorocarbon resin for use in the practice of the present invention. Examples of commercially available PFA resins are TEFLON-P 532-5012 PFA powder resin which is manufactured by E. I. DuPont de Nemours & Company, Inc. of Wilmington, Del. and which is described in DuPont Fact Sheet TI-14-84, and Neoflon AC-5539 and Neoflon AC-5500 PFA powder resin, both manufactured by Daikin Industries, Ltd. of Osaka, Japan.

DuPont recommends said 532-5012 resin for use as an intermediate resin to be overlayed onto other primer systems, followed by the application of other top coat resins overlayed onto a coating formed from the 532-5012 resin. Daikin, likewise, recommends said AC-5500 or AC-5539 resins for use as a top coat resin to be overlayed onto an intermediate resin which, in turn, is overlayed onto a primer resin. (DuPont's 850-300 Teflon primer system, believed to consist of a chromium oxide-containing polytetraflurorethylene, is recommended by both Daikin and DuPont as a primer resin). However, the aforementioned 532-5012 resin and the AC-5500 and 5539 resins have been found to be a quite acceptable resins for forming primer coatings when used in accordance with the present invention.

Examples of other commercially available fluorocarbon resins for use in the practice of the present invention include AUSIMONT'S HALAR® 6014 E-CTFE copolymer resin; DuPont's TEFZEL® 532-6000 E-TFE copolymer resin; and Kreha Corporation of America's KF polymer poly(vinylidine fluoride) resin (PVDF).

With respect to polyether resins, they have outstanding mechanical properties (flexural and tensile, resistance to abrasion, wear and creep under load) and have the best radiation resistant properties of any plastic material. Polyetheretherketone (PEEK) is a particularly useful polyether, having a lower oxygen permeability and water vapor transmission level than the most resistant fluoropolymers. Polyetherketone (PEK) and polyethersulfone (PES) are also particularly useful.

Polyether resins also have excellent adhesion to metals as well as good compatibility with fluorocarbon resins making polyether resins excellent primers for top coatings formed from fluorocarbon resins.

Turning now to a description of the property-improving additive of the present invention, they are also known materials. Preferably, the particle size of the additive does not exceed the particle size of the resin (A) or (B) constituent. It appears that the additive is present in the fused coating in discrete particle form. In the case of an organic additive, the shape of polymeric particles are changed by the heat of the fusing process.

With respect to additive (C) above, that is, poly(phenylene sulfide), examples of commercially available PPS resins which can be used are Ryton type V-1, P-4 or P-6 as manufactured by the Phillips Chemical Company of Bartlesville, Okla. The Ryton type V-1 PPS resin is most preferred. The PPS should be used in fine particle size form. It is recommended that the particle size thereof be about 1 to about 200 microns, preferably about 10 to about 100 microns.

With respect to the ceramic powder of additive (D) above, this includes fine particle size, inorganic crystalline materials. A ceramic powder is characterized typically by its ability to be converted by sintering into a chemically inert material. Examples of ceramic powders that can be used as additive (D) above are: refractory carbides such as silicon carbide, tungsten carbide, molybdenum disilicide and boron nitride; metal oxides such as alumina, chromic oxide, powdered quartz, cerium oxide, silicon oxide, beryllia and zirconium oxide; silicon nitride, titanium diboride and aluminum diboride.

The ceramic powder can be in various forms, for example, in the form of regularly or irregularly shaped crystals, whisker fibers, long fibers, and platelets.

Metal carbide powders are a preferred additive for use in the present invention. The preferred carbides include silicon carbide, zirconium carbide, tungsten carbide and boron carbide, silicon carbide being most preferred.

A consideration in selecting the type of ceramic powder to be used is its resistance to the corrosive effects of the chemical material with which the resin composite material is to be used. It is believed that alpha silicon carbide is the most corrosive resistant type of ceramic powder available in respect to corrosive attack by a very broad range of chemical materials. Thus, it is highly preferred. In addition, silicon carbide is a low-cost material. However, for a variety of reasons, such as cost factors, etc., another type of ceramic powder may be selected.

Examples of commercially available silicon carbide powders are 39 Crystolon green silicon carbide flour as marketed by the Norton Company of Worcester, Mass. and Arendahl SIKA SiC powder, marketed through Standard Oil Electrominerals Co. of Niagara Falls, N.Y. These are recommended for use in the practice of the present invenion.

The ceramic powder to be used is preferably no larger than the particle size of the resins with which it is to be mixed and should preferably be within the size range of about 1 micron to about 40 microns, most preferably up to about 5 microns in size.

With respect to the fluorocarbon resin of additive (D) above, such resin additive can be any one or more of the fluorocarbon resins of (A) above. Other fluorocarbon resins can be used also as the property-improving additive for use with a polyether resin of (B) above. Such other resins are those which include polymers that do not have hydrogen atoms and in which there are at least three fluorine atoms for each other halogen atom (for example chlorine) that may be in the polymer. Polytetrafluoroethylene (PTFE) is an example of such a fluorocarbon resin.

The particle size of a fluorocarbon additive for use in admixture with a polyether resin of (B) above should preferably be about 1 to about 200 microns, preferably about 20 to about 120 microns.

With respect to the non-resinous, property-improving additives of (E) above, such materials are selected ceramic powders within the class of ceramic powders of (D) above. The particle sizes of such selected ceramic powders can be like those of the generally described ceramic powders mentioned above. Similarly, and as also described above, the preferred additive of (E) above is a metal carbide most preferably silicon carbide.

With respect to the polyether additive of (E) above, the particle size thereof can be like those of the generally described polyether resins mentioned above. The preferred polyether resin additive of (E) above for use in admixture with the fluorocarbon resin of (A) above is PEEK.

There follow hereafter general descriptions of the effects that the property-improving additives have on coatings formed from compositions of the present invention and also general observations respecting the characteristics of coatings of the present invention.

In general, it has been observed, most notably in the use of ceramic powders, particularly with fluorocarbon resins, that bond strength between the coating and an underlying metal substrate increases with increased quantities of ceramic powder in the composition. On the other hand, resistance to corrosion by chemical attack is observed to be highest where relatively small amounts of ceramic powder are added to the resin, corrosion resistance being observed to decrease as amounts of ceramic powder in the resin are further increased.

As mentioned above, polyether resins have excellent adhesion to metals a well as good compatibility with fluorocarbons, making polyethers excellent primers for fluorocarbon resin-based top coatings. Where the specific need for the special properties of a polyether resin-based coating is required in a metal protecting coating, polyether resins in admixture with either ceramic powders or fluorocarbon polymers or both may be used to advantage. Silicon carbide is a preferred ceramic powder and PFA is a preferred fluoropolymer.

Wear and load-bearing properties of polyether resin-based coatings are improved by the addition of ceramic powders, particularly silicon carbide.

Substition of PES for PEEK or PEK is useful where some temperature and chemical resistance can be sacrificed. The major advantage of PES is its exceptionally low cost as compared to both PEK and PEEK.

Applications of composite mixtures of SiC-containing polyether resins as coatings to metal roll surfaces which are subject to high abrasion and wear as well as high nip roll loading at elevated temperature provide exceptional life performance in resistance to damage in applications such as papermaking, calendering and extrusion lamination, for example, of plastics employed in packaging and similar industries.

Where release characteristics are desired, a fluoropolymer, for example PFA, may be added to the formulation to impart release properties. Other applications for release, corrosion-barrier, wear- and load-resistant coatings will be evident to those with experience in end use application materials.

In general, the smaller the particle size of the resin constituent, the better the properties of the coatings.

The major constituent of the composition of the present invention is a fluorocarbon resin and/or a polyether resin of (A) and (B) above, the property-improving additive being present in a minor amount. Although the additive can be used in an amount approaching 50 wt. % of the composition, it is preferred that the amount of additive comprise a lesser amount. The property-improving additive can be used in a bond-improving amount, preferably about 1 to about 40 wt. %. Such amounts improve also the abrasion-resistance of the coating. Additives providing an improved resin barrier coating which inhibits corrosion of an underlying metal substrate should be used in amounts of about 1 to about 25 wt. %, preferably about 1 to about 20 wt. %, and most preferably about 2 to about 5 wt. %.

There follow descriptions of preferred embodiments within the scope of the present invention.

In a preferred embodiment of the present invention, a perfluoroalkoxy (PFA) resin is used to form a primer coating. The primer coating, that which is directly in contact with the underlying substrate, most typically a metal surface, is a PFA resin, predominantly in a powder size range of about 1 micron to about 200 microns, preferably predominantly in a range of about 20 microns to about 120 microns, preferably modified with the addition of a polyether.

A preferred PFA-based primer coating may be formed from polyether resin, preferably in an amount of about 2 to about 40 wt. %, most preferably about 5 to about 20 wt. %. A very acceptable primer coating can be prepared by mixing 15 wt. % PEEK type 150 PF (Batch No. SPG9-191p), as manufactured by ICI America, Inc., with 85 wt. % of Neoflon AC-5500 PFA resin.

An alternative PFA-bassed primer-coating may be formed from PPS which is preferably present in an amount of about 2 to about 20 wt. %, most preferably about 5 to about 10 wt. %.

A very acceptable primer coating can be prepared from a composition comprising 7 wt. % of Ryton type V- 1 PPS resin and 93 wt. % of Neoflon AC-5500 PFA resin.

In another embodiment of the present invention, ethylene-chlorotrifluoroethylene (E-CTFE) copolymer resins, ethylenetetrafluoroethylene (E-TFE) copolymer resins, or poly-(vinylidine fluoride) (PVDF) resins are used to form primer coatings, modified with the addition of a polyether and also a selected ceramic powder, preferably a metal carbide, and most preferably silicon carbide or zirconium carbide, in an amount less than 50 wt. %, preferably in an amount of about 1 to about 25 wt. %, most preferably about 2 to about 20 wt. %.

In another embodiment of the present invention, a composite coating is formed from the aforementioned primer compositions and an overlay or barrier top coating is formed from a composition comprising PFA and ceramic powder, using as the PFA TEFLON-P 532-5010 PFA powder resin which is marketed by DuPont (Fact Sheet TI-13-84). The ceramic powder is used in an amount preferably within the range of about 0.5 to about 5 wt. %, most preferably about 1 to about 3 wt. %.

Where the fluorocarbon resins are used to form a corrosion-resistant barrier coating, they may be modified to advantage with a selected ceramic powder in an amount of about 0.5 to about 5 wt. %, preferably about 1 to about 3 wt. %, and most preferably about 2.5 wt. %.

In applications subject to abrasion and wear, an outer top coating of any of PFA, E-CTFE, E-TFE and PVDF in admixture with less than 50 wt. % of ceramic powder, preferably silicon carbide or zirconium carbide, may be used to advantage.

A very acceptable polyether-containing primer coating of E-CTFE can be prepared from about 10 wt. % 39 CRYSTOLON green silicon carbide flour (up to 5μ in particle size) and AUSIMONT'S HALAR® 6014 E-CTFE resin.

A very acceptable corrosion-resistant barrier top coating of E-CTFE can be formed from about 2.5 wt. % of 39 CRYSTOLON green silicon carbide flour (up to 5μ in particle size) and about 97.5 wt. % of AUSMONT'S HALAR® 6014 E-CTFE resin.

Additional polyether-containing primer coatings may be formed from about 25 wt. % 39 CRYSTOLON silicon carbide and DuPont TEFZEL 532-6000 E-TFE copolymer. A 5 wt. % SiC-containing coating of TEFZEL may be used to excellent advantage as a corrosion-resisting barrier coating.

A composition comprising 5 wt. % 39 CRYSTOLON silicon carbide and 95 wt. % Kreha Corporation of America KF polymer PVDF resin may be used to advantage in forming a barrier coating having excellent corrosion-resistant properties.

In a most preferred embodiment of the invention, there is provided a composite of a build up of PFA mixed with the addition of about 1 to about 20 wt. %, preferably about 1 to about 5 wt. %, and most preferably about 2 wt. % of a selected ceramic powder dispersed within the PFA resin, as a top barrier coating, overlayed onto and integrally bonded to a primer coating of PFA/polyether which in turn is overlayed onto and integrally bonded to a metal substrate, in particular a metal substrate.

A primer or barrier coating may be formed also from a composition comprising PEK, PEEK, or PES admixed with about 1 to less than 50 wt. %, preferably about 2 to about 25 wt. % of a ceramic powder. The composition can be applied to a metal substrate in dry powder form, for example, by electrostatic means used for fluoropolymer-based coating compositions or by other known methods such as, for example, fluidized bed methods, floccing methods, etc.

The addition of SiC in the range of about 20 to about 25 wt. % to about 80 to about 75 wt. % of either PEK or PEEK produces a polyether resin coating composition which can be formed into a coating which exhibits significant reduction in abrasion, wear and creep under load relative to neat polyether resin-based coatings which do not contain SiC. The addition of chemically resistant SiC with its exceptional hardness enhances the already superior mechanical properties of the polyethers.

Polyether resin-based compositions containing either or both fluoropolymers and ceramic powders, for example, PFA and silicon carbide, may be used to advantage when applied as a coating to the chemical seal and drive portion of agitators employed in chemical vessels for mixing corrosive chemicals, as such coatings have excellent chemical-resistance and very desirable wear-, abrasion- and creep-resistance under load, particularly at elevated temperatures.

The same preferentially applied polyether resin-based composite is also useful when applied to the tips of agitator blades subject to high abrasion and wear, particularly when exposed to mixing liquids containing abrasives. In such applications, preferred coatings include a SiC-containing polyether coating applied directly to the metal substrate or over a SiC-containing fluorocarbon resin-based primer coating.

The present invention encompasses applying an undercoat of resin/additive composition to a substrate and integrally heat bonding it to the substrate followed by the application of successively built-up top coat layers and integrally bonding each, respectively, to both the undercoat and each preceding layer of the top coat. The coating composition may be applied in a dry powder form, electrostatically, or by a wet spray system, or by other known methods such as, for example, fluidized bed methods, floccing methods, rotomolding, and rotolining etc.

The present invention encompasses also a method of applying coating composition by wet spraying to form both the top coating and the primer coating, as well as the process of forming the aforementioned as a barrier coating and also a formulation for wet-spraying the coating composition.

PRE-APPLICATION PREPARATION OF TOP COAT RESIN

In preparing the resin for application to the substrate, a preferred procedure is described below for a fluorocarbon resin and ceramic dry powder mixture of PFA and silicon carbide.

1. Five micron particle sized SiC powder is weighed out and sieved through a series of Tyler mesh screens to break up agglomerations. The powder is first sieved through a 42 mesh screen, second through a 100 mesh screen, third through a 325 mesh screen and finally through a 400 mesh screen. The sieving operation is accomplished by shaking the screens either manually or preferably mechanically using an automatic sieve shaker apparatus as is well known to those with skill in the field. Two wt. % of the sieved silicon carbide powder is then placed in a suitable container for roller mixing.
2. Ninety-eight wt. % PFA resin is then added to the sieved silicon carbide powder in the roller mixing container and that container is sealed. A suitable container for mixing is a polypropylene jar or bottle which can be obtained from a variety of different sources as is well known to those with skill in the field. It does not matter whether the resin is added to the silicon carbide powder in the jar or the silicon carbide powder is added to the resin therein. Whatever is most convenient will suffice.
3. After the two components are placed in the container and the container is sealed, the container should be shaken thoroughly to disperse and separate the particles of silicon carbide powder to ensure that agglomeration does not occur.
4. The sealed container is then placed on a roller mill and rolled for about 0.5 hour to fully and evenly mix the two components together to produce a homogenous mixture of the resin and the silicon carbide powder. An acceptable roller mill for this purpose is a Norton 735 RM Jar Mill, marketed by the Norton Company, although many competitive devices are also on the market and readily obtainable as is well known to those with skill in the field.
5. The mixture, now ready for application, is emptied from the container into the fluidized bed hopper of an electrostatic spraying apparatus. An acceptable electrostatic spraying apparatus, including a fluidized bed powder container (hopper), is the Ransburg GEMA 701 unit, marketed by Ransburg Corporation of Indianapolis, Indiana, although a variety of competitive models are available from other sources as is well known to those with skill in the field. This unit is used to apply the primer resin, as well as the overlay or top coat resin mixture, the preparation of which has been described above.

PREPARATION OF METAL SUBSTRATE FOR COATING

Before any of the resins can be applied, the substrate metal must be prepared. Typically a mild, low carbon steel substrate metal is most commonly used; however, various other ferrous and non-ferrous metals may be used as the substrate metal. It is preferred to employ carbon steel as a metal substrate because of its low cost, although the surfaces of other metals may be coated if prepared to accept the primer resins of the present invention. The preparation of the substrate metal surface is substantially the most important consideration, as distinguished from the species of metal to be used as a substrate. Specifically, the substrate metal surface must be cleaned such that it is free of oils, greases, blasting grit, water and other contaminants to the degree reasonably practicable in generally accepted shop conditions in the coating industry. This can be done, for example, using standard solvent cleaning techniques as are well known to those with skill in the art. After the surface of the substrate metal has been cleaned of surface contaminants, the following procedure may be used for the preparation of a mild low carbon steel substrate:

6. The steel piece is grit blasted with 3/0 (000) size silica (sand) which is both fresh (unused) and dry. Alternatively, a reusable blasting medium such as 24 grit aluminum oxide can be used. After blasting, the blasted surface should not be touched with bare hand; it is recommended that clean gloves be worn. Care should be taken to avoid contamination of the blasted surface from water, oil, grease, dirt, etc. The blasted surface should also be inspected at this point to find any surface defects in the metal. If there are any deep grooves, sharp edges, pinholes or weld defects, such should be repaired at this point and the surface re-cleaned and reblasted as above. The grit blasting roughens the metal surface of the metal and, thus, enhances the bonding of the primer resin thereto.

7. Within twelve (12) hours of the above described blasting step, preferably sooner, the metal pieces should be placed into an oven for heating. An example of an electric oven which can be used and which was used in the examples described hereinafter, is the Ramco Model RT-215 (Serial No. 813054) as manufactured by Ramco Equipment Corporation of Hillside, N.J.

8. Optionally, the pieces may be blasted a second time, this time preferably with an 80 grit size aluminum oxide/titanium oxide grit, within about 0.5 to 1.0 hour before they are placed into the oven. This second blasting is recommended in humid weather to eliminate any rust which may have formed on the surface since the first blasting step.

9. Whether or not one or two blasting steps are utilized, just before the pieces are to be placed into the oven, the pieces should be vacuum cleaned, using a suction type vacuum cleaner, to remove any residue of blasting grit. Following the vacuum cleaning, the pieces should be thoroughly brushed with a non-metal bristle, non-shedding brush. The blasting steps accomplish two things: firstly, the surface is cleaned, and, secondly a surface texture is developed which is most advantageous for and facilitates the bonding of the primer resin thereto.

10. As the pieces are being loaded into the oven, a thermocouple should be attached to each on a surface of the metal which is not to be coated with a barrier coating. These thermocouples should be connected to standard apparatus to enable the monitoring of the temperature of each piece within the oven.

11. The bare substrate metal pieces are then "baked" in the oven. The oven temperature, being set at 760° F., the pieces must be soaked in the oven for a sufficient time to bring the temperature of the pieces up to 740° F., as the pieces will never reach the set temperature of the oven, due to convection, conductance, etc. associated with the design characteristics of ovens of such type. In addition to this temperature equalization step, preferably when the temperature of the pieces has reached 740° F., a timer should be set so that the pieces are "baked" in an air atmosphere for a period of at least one (1) hour but not more than eighteen (18) hours (to avoid unnecessary surface oxidation). The purpose of this extended "bake-out" time is to drive out essentially all of the gases, organics and other contaminants which may be trapped within the interstitial metal structure thereof. Higher "bake-out" temperatures and/or shorter "bake-out" periods may be used. Once the "bake-out" is finished, the pieces are now ready to be removed from the oven and sprayed with the primer resin.

APPLICATION OF FLUOROCARBON RESIN AND ADDITIVE MIXTURE

The spraying of the resin powders, both the primer resin and the top coat resin mixture, requires particular care as control of the substrate temperature ranges are important. Also control of the ranges of thickness of the coats is important. Finally, it is important that the thicknesses of each coating be controlled within defined ranges, from one section to another across the surfaces of the substrate metal pieces; that is to say that the spray application of any given layer of coating should be controlled such that it is not too thick at any given point and/or not too thin at any given point. A procedure used for the application of a PFA/PPS primer coat to the metal substrate, following "bake-out" of the pieces is preferably as follows.

A. PRIMER LAYER APPLICATION

12. The pieces should be removed from the oven with the temperature of the pieces being at least about 700° F., with the thermocouples still attached to each piece. The first spraying of the primer resin should be commenced preferably within thirty (30) seconds from the time the pieces are removed from the oven with the temperature of the pieces preferably not being lower than about 680° F., although it is quite acceptable that the finishing touches of the spraying may be added as long as the discrete section of each piece, which is then being sprayed, is above the resin melting point. Spraying may be done, simply, but not preferably, until no more of the powder primer resin melts onto the pieces. The melt range of the PFA/PPS resin mixture is 575° F. to 600° F., but the powder resin will not normally melt as it hits the metal unless the metal is at about 600° F. or above. The thermocouples attached to each piece only show the temperature of that portion of each piece which is immediately adjacent to the thermocouple attachment point, while other sections of each piece may be higher or lower in temperature, depending on the rate of cooling of each discrete section of each piece. Thicker sections will cool more slowly while thin sections will cool relatively rapidly. Preferably, the thickness of the primer resin will be within the range of about 0.002" to about 0.005", although primer coat thicknesses in the range of about 0.001" to about 0.025" have been found acceptable. The setting on the Ransburg GEMA 701 electrostatic spray apparatus will vary according to the size of the pieces, the thickness of each discrete section of the substrate metal, and the geometry of the pieces. An appropriate setting for a ¼× 8"×8" mild steel plate is 40 Kv. The primer resin is preferably applied in a single spraying, forming a single layer, although in some circumstances an additional layer or more may need to be applied. If such is necessary, additional coats of primer resin may be applied as follows.

B. APPLICATION OF ADDITIONAL "PRIMER" LAYERS

13. After the first layer of primer resin has been sprayed onto the pieces, additional layers may be applied but are not necessary to improve bond strength. Such additional layers may be used to provide a transition between the metal substrate which characteristically has a low coefficient of expansion and top coat material which has a higher coefficient of expansion. If an additional layer of primer resin is to be applied, the pieces are then returned to the oven. The oven should be set at about 700° F. When the temperature of the pieces has reached 700° F. and all portions of the first coating have reached the melt phase, as is determined by visual inspection through a window in the oven (usually requiring a soaking of about twenty (20) minutes), and if it is determined that one or more additional layers of primer resin are necessary, the pieces are again removed from the oven and a second layer of primer resin is sprayed on, overlaying the first layer. Because of notably poor heat transfer in fluorinated polymers, the first layer will hold the temperature of the pieces allowing ample time for the second layer to be sprayed on at this temperature. The actual surface temperature of the first coat may drop to about 650° F. or less, but should not drop below about 600° F. The objective is to obtain a primer resin build up of about 0.002" to about 0.02". In applying the second layer (and any necessary additional layers) of the primer resin, the Ransburg GEMA 701 electrostatic spraying apparatus may be set at about 30 to 40 Kv. for a ¼"×8"×8" piece of mild steel.

14. Whether or not additional layers of primer resin are applied over the first layer of primer resin, following the last layer of primer resin sprayed on, the pieces are returned to the oven which is set at 700° F. until inspection determines that the last layer of primer resin has reached the melt phase.

A procedure used for the application of a PFA/SiC top coat to a "primed" metal substrate is preferably as follows.

C. APPLICATION OF TOP COAT LAYERS

15. The pieces are removed from the oven and sprayed with the first layer of topcoat resin mixture, using the Ransburg GEMA 701 electrostatic spraying apparatus, which may be set at about 30 Kv. for a ¼"×8"×8" piece of mild steel. Care should preferably be taken to ensure that the temperature of the pieces being sprayed should always remain at or above the 575° F. to 600° F. melt range of PFA. The thickness of each layer of top coat resin which is sprayed should preferably be within the range of about 0.006" to about 0 01", although layer thicknesses within the range of about 0.001" to about 0.015" have been found to be acceptable.

16. After the first layer of top coat resin mixture has been sprayed onto the pieces, they are placed back into the oven and heat soaked until the just-sprayed resin coat has fully melted.

17. Successive layers of top coat resin mixture are applied in the same manner, following the specifications set forth in Step. Nos. 15 and 16 above. The objective is to form an overall barrier coating on the pieces which is at least 0,040" thick but which may be of a greater thickness. Thus, as many layers of top coat resin mixture are applied as are necessary to achieve such a thickness. After the last layer of top coat resin is applied, the pieces are first reduced in temperature to 550° F. in the oven, by shutting the oven off but continuing to circulate air in the oven with the oven blower. When the pieces reach 400° F., they are removed from the oven and cooled to room temperature, thus being ready to place into service.

WET SPRAY APPLICATION

Where there is a need to form a barrier coat type composite, in accordance with the present invention, in relation to the substrate metal of relatively large metal apparatus, such as tanks and pressure vessels, there is a problem in applying the fluorocarbon resins to the substrate metal. Normally, in such apparatus, the barrier coating is needed on the inside walls of tanks, vessels and the like. To follow the procedures described above would necessitate manual spray of the interior of a tank or vessel which is at a temperature in excess of 600° F. It would be impossible to place a person inside a tank or vessel at such a temperature to effect the required spraying operations.

It is envisioned that such spraying of the interior of hot vessels might be effected by the application of robotics technology; however, until such is developed, an alternate approach has been followed for spraying the fluorocarbon resins, and mixtures thereof with fine crystalline ceramics, onto substrate metals at ambient temperatures, while still achieving the high integrity bonding of those resins and resin mixtures to the substrate metal, and to each other, substantially free of voids (porosity).

To develop the barrier coating of the composite of the present invention, each layer of both the barrier resin and the top coat resin may alternatively be applied to a piece when that piece is at ambient (room) temperature. However, each of those layers is sprayed on wet, rather than as a dry powder, and electrostatic spraying apparatus is not used. A preferred method of developing the composite of the present invention, using wet spraying, is as follows.

A. PREPARATION OF AQUEOUS DISPERSION

Preliminarily, a top coat resin mixture in a water suspension is prepared most preferably comprising: 96.04 wt. % of PFA resin; 0.04 wt. % of Dow Corning Anti-Foam A antifoaming additive, marketed by Dow Corning Corporation of Midland, Mich.; 1.96 wt. % of 5µ silicon carbide; and water (in the laboratory, de-ionized water may be used but in production, standard "softened" water, with the minerals removed, is quite satisfactory). To prepare a sample of the mixture in a water suspension, 100 ml of refrigerated, de-ionized water is deposited into the mixing container of a Waring model 34BL21 high speed blender. The blender is then turned on and the speed is adjusted to the highest speed which will still maintain a smooth vortex without splashing. Two grams of Triton X-100 are added to the blending water with a standard eye dropper, a drop at a time. Then add 0.05 gram of Anti-Foam A to the blending water and reset the Variac control on the blender to 20–30V. Mix the solution at this speed for one (1) minute. Then reset the blender Variac to 60V and slowly add 2 grams of silicon carbide to the solution. Then set the blender Variac to 60V–70V and add 98 grams of PFA resin slowly to the center vortex of the blending solution. If the PFA resin does not disperse, add additional water to the blending solution in 5 ml increments until the PFA resin disperses. The dispersion of the PFA resin is aided by using refrigerated water, although this is not a necessity. it has been found that this formulation, in modified form, produces acceptable coatings where as much as 99.9 grams of PFA resin are added and as little as 0.1 gram of silicon carbide powder is mixed in.

B. PRE-APPLICATION PREPARATION OF METAL SUBSTRATE

Secondly, the piece to which a barrier coating is to be bonded is prepared in exactly the same way as specified above in No. 6 through 11, with the prior cleaning step, prior to sand blasting, as specified above, included. Once the "bake-out" procedure has been completed, the piece is removed from the oven and air cooled to below 100° F.

C. WET SPRAY APPLICATION OF PRIMER COAT

Thirdly, a primer resin coat should be applied. A preferred primer resin coat may be the PFA/PPS resin mix described above or it may be the DuPont 532-5012 resin. Either of these may be applied electrostatically using the Ransburg GEMA 701 electrostatic spray apparatus by spraying a preferred thickness of 0.002" to 0.005" per layer of resin to the cold (room temperature) piece. Then the piece, with the thermocouple attached thereto as described above, is inserted back into the oven, set at 700° F. The piece is brought up to temperature and held there until all portions of the primer resin layer have reached the melt phase, as determined by visual inspection through a window in the oven Following this, the oven is shut off with the oven blower still running, and the piece is slow cooled to 550° F., as described above. Finally, the piece is removed from the oven to rapidly air cool to below 100° F. for application of the next layer of primer resin, if necessary. Succeeding layers of electrostatically sprayed primer resin layers may be applied in exactly the same way. Applying the primer resin in this manner may require multiple layers as the sprayed on dry powder, to some extent, tends to fall off of the piece, decreasing the thickness of the layer.

Although the electrostatic dry spray method is preferred, alternatively, the primer resin may be applied wet. Usually, a 0.002" to 0.005" thickness of primer resin coat can be applied in a single layer. The top coat resin mixture in a water suspension, described above, may, in a slightly modified form, be used as a primer resin. For example, in the case of a PFA/PPS primer resin described above, the only change necessary is to reduce the 96.04 wt. % of PFA resin to 90.00 wt. % and to add 6.04 wt. % of PPS resin. In preparing a sample mixture, as a preliminary step, 6.2 grams of PPS resin are thoroughly mixed and blended with 91.8 grams of PFA resin using a roller mill as described above. Then the sample mixture procedure for the water suspension, described above, is used except that the PFA/PPS resin mixture is added instead of the straight PFA resin. The silicon carbide may be, optionally, taken out in the primer resin mixture water suspension.

Prior to spraying on the primer resin mixture water suspension (primer wet spray), the "baked-out" piece, prepared as described above, is removed from the furnace and air cooled to less than 100° F. The primer wet spray is loaded into a one (1) quart pot for a Binks model 18 spray gun which is used to apply the primer wet spray to the piece, as marketed by Binks Manufacturing Company of Franklin Park, Ill. Preferably, the Binks model spray gun is equipped with a Binks No. 66SS fluid nozzle, a Binks No. 66SF air nozzle and a Binks No. 65 needle. The primer wet spray in the one (1) quart pot should, preferably, be shaken intermittently, but frequently, to keep the solids in the primer wet spray in suspension. The air pressure used to apply the primer wet spray should, preferably, be within the range of about 40 psi to about 50 psi.

In spraying the piece, now below 100° F. in temperature, preferably at room temperature for ease of handling, the spray should be applied evenly, first to the critical areas where complex relatively sharp curvatures, corners, etc. exist, then to the relatively more smooth, less curved, flat, etc. areas. Care should be taken to avoid running and overspray of the primer wet spray on the piece. Also, as mentioned before, care must be taken to see that the solids suspended in the water, in the primer wet spray, do not separate during the spraying operation. All spraying of the primer wet spray should preferably be done without a break in the operation. Stopping the operation will allow the primer wet spray on the piece to dry. When this occurs and the spraying is recommenced, the dried material can easily be blown off by the atomizing air of the spray gun. Thus, it is recommended that the spraying always be done against a trailing wet edge, as is well known to those with skill in the field. An even layer of primer wet spray should be applied by spraying by a steady, even movement of the spray gun. The primer wet spray should be applied until a single layer in a range of about 0,002" to 0.005" thickness is built up, preferably in a range of about 0.004" to 0,005" as measured in the wet condition. A Nordson Wet Film Thickness Gauge, as marketed by Nordson Corporation of Amherst, Ohio, may be used to determine the thickness of the wet sprayed layer.

Once the primer wet spray coating has been applied, as a single layer, the piece is preferably air dried for about fifteen (15) minutes. Then the piece should be placed in a preheated oven set at 350° F., with a thermocouple attached as explained above. After the piece is so placed in the oven, without delay, the oven should be reset to 720° F. When the temperature of the piece reaches 700° F. and the primer wet spray coating, fully dried, and all surfaces thereof have reached the melt phase, as determined visually, the oven is turned off, with the oven blower still running, and the piece is cooled in the oven until it reaches 550° F. At this point, the piece is removed from the oven and air cooled to below 100° F., preferably to room temperature, for application of the top coat wet spray.

D. WET SPRAY APPLICATION OF TOP COAT SUSPENSION

The top coat wet spray may be the top coat resin mixture in a water suspension described above, without PPS resin and definitely with silicon carbide included. The top coat wet spray is sprayed onto the piece, preferably at room temperature, in layers, exactly following the spraying techniques described above for the primer wet spray resin, except that the thickness of each layer of top coat wet spray is greater, preferably in the range of about 0.010" to about 0 014", with due care being taken to avoid running and overspray. The objective is to build up an overall barrier coating of at least about 0.040" in thickness.

After each layer of top coat wet spray is sprayed onto the piece, the piece is air dried for fifteen (15) minutes and placed into a preheated oven set at 350° F., with the thermocouple attached as described above. Then, without delay, the oven is reset for 650° F. and the temperature of the part is brought up to the point where visual inspection assures that the now dried top coat wet spray layer is in the melt phase, or until the piece temperature reaches 620° F., whichever comes first. If the melt phase is reached before the piece temperature reaches 620° F., preferably, continue to heat the piece for about ten (10) minutes or until the piece reached 620° F., whichever comes first. Then the oven is shut off with the blower still running and the piece is cooled to 550° F., followed by removal of the piece from the oven for air cooling to below 100° F. This heating-cooling cycle is repeated for each layer of top coat wet spray applied.

Additional advantages of the present invention are that the use of a property improving additive, as described herein, is effective in increasing the rate at which the coating composition can be fused. By way of background and as exemplary of the aforementioned, it is known to those with skill in the field, as exemplified by the two (2) DuPont Fact Sheets mentioned above, that it is difficult to get good fusion or sinterinng of particles of PFA resin to each other, or to primer systems over metal substrates, at temperatures below about 700° F. within time periods that can be used practically in a commercial setting. Thus, it is conventionally recommended that PFA resins should be fused at about 725° F. for about 20 minutes. However, it is also known that PFA, as a fluorinated polymer, deteriorates (degrades) relatively quickly at temperatures of about 700° F. and above, as fairly rapid oxidation occurs. Thus, the objective is to effect a complete fusion of the resin particles before the resin itself degrades. It can be appreciated that it is relatively difficult to get good bonding of PFA resin to metal substrates and to get one layer of PFA resin bonded to another.

By way of example, neat powdered PFA resin, applied directly to a 8"×8"×¼" mild steel plate brought to a temperature of about 725° F., fuses completely in about 20 minutes; at 675° F., fusion is completed in about 30 minutes; and at 620° F., fusion is completed in about 40 to about 50 minutes. The addition of powdered ceramic material to the resin significantly reduces the time necessary to complete the fusion of the resin particles. When powdered PFA resin and cermaic material is applied to a mild steel plate heated to about 725° F., fusion of the resin is completed in about 10 minutes; at 675° F., fusion is completed in about 15 to about 20 minutes; and at 620° F., fusion is completed in about 30 to about 40 minutes.

Thus, a preferred method for forming a fused coating from the composition of the present invention includes heating said composition to a temperature for a period of time no longer than a predetermined period of time, said temperature being at least 25 F° below the temperature at which the resin of said composition in neat form can be fused completely by heating for no longer than said predetermined period of time without substantially degrading said resin.

It has also been observed that where neat powdered resins are applied to an already resin-coated metal substrate, the time to complete fusion is increased to even longer periods than those just recited above. It is suspected that this longer fusion time ts due to the heat insulating property of the previously applied neat resin layer. Thus, to effect complete fusion of the top-most resin layers, it is necessary to prolong the period over which the plate is heated, thereby degrading the bottom-most resin layers in closest proximity to the substrate surface.

The addition of ceramic powders to the resin speeds the fusion process, perhaps due to the improved heat conductivity of ceramic powder-containing resins. Thus, all of the resin layers may be brought to fusion temperature more quickly, reducing the exposure time and concomitant degradation of the bottom-most layers.

It is also known that it is relatively difficult to achieve bonding of straight PFA resin to metal substrates, regardless of the temperature of fusion or sintering used. It has now been determined that the addition of the above specified quantity ranges of PPS resin to the PFA resin, surprisingly results in a very high quality integral bonding of the PFA resin to substrate metals at temperatures in the range of about 675° F. to about 720° F. without significant deterioration (degradation) to the PFA. It is also now known that a very similar phenomenon occurs in dry sprayed PFA resin without the addition of PPS resin, but with the addition of the specified quantity ranges of ceramic powder, in those same temperature ranges. No explanation of why these phenomena occur is known and no speculation thereof is offered herein.

EXAMPLES

EFFECT OF ADDING SiC TO PFA TO ELIMINATE RESIN BUBBLING

In the examples which follow, Sample Plates (A–G) were fabricated to determine the effects of adding silicon carbide to PFA resin in respect to the occurrence of bubbling of top coat layers during the build up of the barrier coat. In all cases, DuPont TEFLON-P 532-5012 PFA resin was used as the primer resin and DuPont TEFLON-P 532-5010 PFA resin mixed with silicon carbide powder (as indicated) was used as the top coat resin. The sample plates were formed using ¼"×8"×8" size mild steel plates and composites were formed thereon in accordance with the foregoing procedures. The results are as follows in Table 1.

TABLE 1

| Sample Plate | A | B | C | D | E | F | G |
|---|---|---|---|---|---|---|---|
| Primer Thickness (inch) | .021 | .022 | .021 | .018 | .024 | .017 | .001 |
| No. of Layers | 2 | 2 | 2 | 2 | 2 | 2 | 1 |
| Top Coat PFA wt. % | 100 | 99.75 | 99.5 | 99 | 98 | 98 | 99 |
| SiC wt. % (Particle Size) | 0 — | 0.25 5μ | 0.50 5μ | 1 5μ | 2 5μ | 2 5μ | 2 5μ |
| Thickness (inch) | .008 | .007 | .007 | .007 | .008 | .040 | .018 |
| No. of Layers | 1 | 1 | 1 | 1 | 1 | 7 | 3 |
| Steel Temp. (°F.) | 675 | 675 | 675 | 675 | 675 | 675 | 675 |
| Barrier Coat Total Thickness (inches) | .029 | .029 | .028 | .025 | .032 | .057 | .019 |
| Bubbling | Yes | Slight | Very Slight | No | No | No | No |

It can be seen from the results reported in Table 1 above, that when sample plate A was sprayed with a top coat of 100% PFA, it exhibited bubbling after a single layer of top coat was applied. With the addition of 0.25 wt. % of silicon carbide to the PFA top coat, the bubbling was significantly reduced with the application of a single layer of top coat as shown in Sample Plate B. The single layer of top coat applied to Sample Plate C had 0.5 wt. % of silicon carbide added, and the bubbling was reduced to a point where it was just barely noticeable upon visual inspection. In Sample Plate D, 1.0 wt. % of silicon carbide was added to the PFA top coat, and in the single layer applied, no bubbling was detected. In Sample Plate E, 2.0 wt. % of silicon carbide was added to the PFA top coat, and in the single layer applied, no bubbling was detected. Sample Plate F was prepared identically to Sample Plate E, except that 6 additional layers of top coat were applied for a total of 7; again, no bubbling was detected.

In the preparation of Sample Plates A–F, a relatively thick primer coat was applied, using two layers in each case. To determine whether or not a reduction of the thickness of the primer coat, and a single layer application thereof, would generate bubbling in the PFA top coat, with 2 wt. % silicon carbide added, Sample Plate G was prepared, with a single layer of primer coat, only 0.001" in thickness, being applied and then overlayed with 3 layers of PFA/2 wt. % SiC mixture top coat resin. Again, no bubbling was detected. It should also be noted in regard to Sample Plates D and E that thicknesses of 0.007"–0.008" of PFA/SiC mixtures, as a top coat, were applied in single layers without bubbling, whereas, it is known to those with skill in the field that straight PFA cannot be applied in coating layers greater than 0.003" thickness without the occurrence of bubbling. This is pointed out in DuPont Fact Sheet TI-13-84 referenced above.

EFFECT OF SUBSTRATE TEMPERATURE

Several additional Sample Plates (H–L) were fabricated wherein composites were formed on underlying mild steel substrates in accordance with the foregoing procedures. The object of developing these samples was to determine the effect of lowering the metal substrate temperature in respect to the occurrence of bubbling of top coat layers during the build up of the barrier coat. Again, in all cases, DuPont TEFLON-P 532-5012 PFA resin was used as the primer resin and DuPont TEFLON-P 532-5010 PFA resin mixed with silicon carbide powder (as indicated) was used as the top coat resin. The Sample Plates were formed using ¼"×8"×8" size mild steel plates. The results are as follows in Table 2.

TABLE 2

| Sample Plate | H | I | J | K | L |
|---|---|---|---|---|---|
| Primer Thickness (inch) | .017 | .024 | .010 | .022 | .011 |
| No. of Layers | 2 | 3 | 2 | 2 | 2 |
| Top Coat PFA wt. % | 100 | 99.5 | 99 | 98 | 99 |
| SiC wt. % | 0 | 0.5 | 1 | 2 | 1 |
| (Particle size) | — | 5μ | 5μ | 5μ | 5μ |
| Thickness (inch) | .015 | .031 | .006 | .008 | .034 |
| No. of Layers | 3 | 5 | 1 | 1 | 7 |
| Steel Temp. (°F.) | 625 | 615 | 625 | 625 | 625 |
| Barrier Coat Total Thickness (Inch) | .032 | .055 | .016 | .030 | .045 |
| Bubbling | Yes | No | No | No | No |

In Sample Plates I–L, where silicon carbide was mixed with the PFA resin of the top coat, no bubbling was detected where the steel substrate metal temperature was only raised to a range of 615° F. to 625° F. while significant bubbling was noted in Sample Plate H which used straight PFA resin, without silicon carbide, as the top coat where the steel substrate metal temperature was only raised to 625° F.

EFFECT OF SiC PARTICLE SIZE ADDED TO TOP COAT

Several additional Sample Plates (M–R) were fabricated wherein composites were formed on underlying mild steel substrates in accordance with the foregoing procedures. The object of developing these samples was to determine the effect of adding larger sized particles of silicon carbide powder to the PFA top coat resin in respect to the occurrence of bubbling of top coat layers during the build up of the barrier coat. Again, in all cases, DuPont TEFLON-P 532-5012 PFA resin was used as the primer resin and DuPont TEFLON-P 532-5010 PFA resin mixed with silicon carbide powder (as indicated) was used as the top coat resin. The sample plates were formed using ¼"×8"×8" size mild steel plates. The results are as follows in Table 3.

TABLE 3

| Sample Plate | M | N | O | P | Q | R |
|---|---|---|---|---|---|---|
| Primer Thickness (inch) | .010 | .021 | .020 | .020 | .020 | .020 |
| No. of Layers | 1 | 3 | 2 | 2 | 3 | 2 |
| Top Coat PFA wt. % | 90 | 99.5 | 90 | 80 | 99 | 98 |
| SiC wt. % | 10 | 0.5 | 10 | 20 | 1 | 2 |
| (Particle Size) | 7μ | 7μ | 7μ | 7μ | 14μ | 14μ |
| Thickness (inch) | .035 | .026 | .040 | .040 | .021 | .021 |
| No. of Layers | 6 | 5 | 6 | 10 | 4 | 4 |
| Steel Temp. (°F.) | 680 | 615 | 600 | 650 | 620 | 620 |
| Barrier Coat Total Thickness (Inch) | .045 | .047 | .060 | .060 | .041 | .041 |
| Bubbling | No | No | No | No | No | No |

In regard to Sample Plates M–P, silicon carbide powder of 7μ size was mixed with PFA resin and applied to form the top coat with no bubbles detected therein. The top coats of Sample Plates Q and R had 14μ sized silicon carbide powder added to the PFA resins before application. Also, it should be noted in regard to Table 2 that the temperature of the substrate steel metal was varied in a range from 600° F. to 680° F. Finally, it should be noted in regard to Table 2 that the wt. % of silicon carbide which was mixed with the PFA resin to form the top coat resin mixture was varied in the range of 0.5 wt. % to 20 wt. %. In none of these cases, reported in Table 5, did any visibly detectable bubbling occur.

CORROSION RESISTANCE DETERMINATION FOR FLUOROCARBON POLYMER BARRIER COATING OF THE PRIOR ART

British Patent No. 2,051,091, believed to be the detailed specification for developing Fluoroshield coatings, teaches using a composition comprising a mixture of PTFE (polytetrafluoroethylene) resins, and PFA resin to form overlays or barrier coats. These dry powder resin mixtures are mixed with a carrier liquid and, it appears in commercial applications, glass powder, for wet spray applications. British Patent No. 2,051,091 teaches that "To obtain non-porous coatings it is necessary to densify the applied coating. This may be accomplished by rolling the coating prior to heating the coating to coalesce it." It also teaches that " . . . a pure PFA coating is unsuitable and failed to provide a uniform, non-porous coating."

Although British patent No. 2,051,091 discloses several examples, of what are now known commercially as Fluoroshield coatings, which were spark tested at 10,000 volts, none of the examples in that patent discloses actual corrosion tests.

One apparatus which is widely accepted by those with skill in the field for testing corrosion is the Atlas Cell, as marketed by Custom Scientific Glass, Inc. of Elkton, Md., U.S.A. Basically, the Atlas Cell tests materials or exposed material surfaces to the effects of corrosion at either ambient or elevated temperatures, as desired, and for extended periods of time as desired. Various tests have been made on Fluoroshield coated mild steel samples, with one side of each being Fluoroshield coated, exposing only that Fluoroshield coated surface of each of those pieces to the tests. All test samples were commercially acquired specimens of Fluoroshield coated mild steel apparatus. All samples of the tested Fluoroshield coated contained finely ground glass powder. The samples and the test results are as follows in Table 4.

TABLE 4

| Fluoroshield Sample No. | Corrosive Material | Temperature | Time |
| --- | --- | --- | --- |
| 1. | 70 wt. % Nitric Acid | 252° F. | 600 Hours |
| 2. | 20 wt. % Hydrochloric Acid | 220° F. | 600 Hours |
| 3. | 70 wt. % Nitric Acid | 252° F. | 1,000 Hours |
| 4. | 20 wt. % Hydrochloric Acid | 220° F. | 1,000 Hours |

The evaluation of each of these samples, following the above tests, was by subjective observation, in each case relative to a sample in accordance with the present invention, as described hereinafter, and comprise the opinions of the inventors of the present invention. That is to say that each Fluoroshield coated test sample, recited above, was tested under equivalent conditions used to test a corresponding non-Fluoroshield coating test sample, in accordance with the present invention, and compared thereto. The results of such tests of non-Fluoroshield coated test samples are detailed hereinafter in Tables 6–8. The subjective observations in regard to each Fluoroshield coating sample are as follows in Table 5.

TABLE 5

| Fluoroshield Sample No. | Evaluation |
| --- | --- |
| 1. | Coating severely blanched and fully blistered. |
| 2. | Coating blanched and blistered, slight degradation of underlying steel evident, slight delamination evident. |
| 3. | Coating severely blanched and fully blistered, almost total delamination evident, coating substantially pealed away from substrate metal, substantial degradation of underlying substrate metal evident. |
| 4. | Coating severely blanched and fully blistered, degradation of underlying steel evident, substantial delamination evident. |

In each of the foregoing Fluoroshield samples, the blistering is an indication that the overlayed barrier coating may not be firmly bonded to the underlying substrate steel and that the coating is beginning to separate. The blanching or discoloration is an indication that the corrosive medium has penetrated into and even through the pores of the overlayed barrier coating, attacking both additives which have been mixed into the coatings as well as, possibly, the underlying substrate metal. Delamination indicates that the bonding of the Fluoroshield coating to the substrate metal has failed.

As is demonstrated by the Fluoroshield coating tests, above, there is substantial room for improvement in both the integrity of the bond between the overlayed barrier fluorinated polymer coating and the underlying substrate metal, in particular, steel. Also there is substantial room for improvement in diminishing porosity in the overlayed barrier fluorinated polymer coating, irrespective of spark test evaluations.

The use of Atlas cell testing for corrosion testing has been briefly described above in regard to the testing of Fluoroshield coated mild steel samples. An Atlas cell is arranged in the form of a hollow cylindrical section with both ends being open. Ports extend through the sides of the cylindrical section through which instrument sensors and heating elements are inserted into the hollow of the cylindrical section. The open ends of the cylindrical section are capped with the test samples which are to be exposed to corrosion. Such test samples are normally in the form of flat plates, one surface each of which is abutted against an open end of the cylindrical section. The open ends of the cylindrical section are capped with the test samples which are to be exposed to corrosion. Such test samples are normally in the form of flat plates, one surface each of which is abutted against an open end of the cylindrical section and clamped or otherwise mounted thereto so that the joint between is sealed. Because there are two (2) open ends to the hollow cylindrical section, two (2) test samples are used to cap those respective open ends, thus two (2) test samples are simultaneously and concurrently subjected to testing by each Atlas cell test program.

Atlas cell test programs are normally set up to test the effects of a corrosive liquid medium, for example, an acid, which is introduced into the hollow cylindrical section after the open ends thereof have been capped and sealed with the test pieces. The corrosive liquid is introduced through one of the open ports extending through the wall of the cylindrical section, after which the ports are sealed. The corrosive liquid, either heated or at ambient temperature, is left within the Atlas cell for extended periods of time amounting to several hundreds of hours or more.

In each of the above reported 1,000 hour Atlas cell tests of Fluoroshield coated mild steel samples, Fluoroshield Sample Nos. 3 and 4, the opposite end of the Atlas Cell was capped with a sample plate which was a composite according to the present invention. These sample plates, in accordance with the present invention are described hereinafter as Sample Nos. 13 and 14 which correspond, in their Atlas cell testing, to Fluoroshield Sample Nos. 3 and 4 respectively. The sample numbering system is used for convenience in making cross comparisons; thus Fluoroshield Sample No. 1 corresponds to Sample No. 11 and Fluoroshield Sample No. 2 corresponds to Sample No. 12, etc.

The preparation of Sample No. 11 through 14 was in accordance with the procedures described above in accordance with the present invention. In all cases, the primer coat resin used was DuPont TEFLON-P 532- 5012 PFA resin and the top coat resin mixture was 98 wt. % of DuPont TEFLON-P 532-5010 PFA resin mixed with 2 wt. % of 5μ sized silicon carbide powder. In all cases the barrier coat overall thickness of Sample Nos. 11 through 14 exceeded 0.040", but did not exceed 0.060". The details of the preparation of Sample Nos. 11 through 14 are as follows in Table 6.

TABLE 6

| Sample No. | Primer Coat | Top Coat |
| --- | --- | --- |
| 11 | Heated Dry (Electrostatic) | Heated Dry (Electrostatic) |
| 12 | Heated Dry (Electro- | Heated Dry (Electro- |

TABLE 6-continued

| Sample No. | Primer Coat | Top Coat |
|---|---|---|
| | static) | static) |
| 13 | Heated | Heated |
| | Dry (Electro-static) | Dry (Electro-static) |
| 14 | Heated | Heated |
| | Dry (Electro-static) | Dry (Electro-static) |

To further explain the nomenclature used in Table 6, above, the term "Heated" in regard to the "Primer Coat" indicates that the procedure used is that described above, from the point just following step No. 5 through Step No. 11 are followed. The term "Dry (Electrostatic)" in regard to the "Primer Coat" indicates that the procedure used is that described above, from the point just following Step No. 11 through Step No. 14. The term "Heated" in regard to "Top Coat" indicates that the procedure used is that described above, in Step No. 14. The term "Dry (Electrostatic)" in regard to the "Top Coat" indicates that the procedure used is that described above, in Step No. 15 through Step No. 17

Table 7, following, shows the Atlas cell test conditions which Sample No. 11–14 were subjected to, each corresponding to the individual test program to which Fluoroshield Sample Nos. 1–4 were subjected, respectively.

TABLE 7

| Sample No. | Corrosive Material | Temperature | Time |
|---|---|---|---|
| 11 | 70 wt. % Nitric Acid | 252° F. | 600 Hours |
| 12 | 20 wt. % Hydrochloric Acid | 220° F. | 600 Hours |
| 13 | 70 wt. % Nitric Acid | 252° F. | 1000 Hours |
| 14 | 20 wt. % Hydrochloric Acid | 220° F. | 1000 Hours |

The subjective observations in regard to the evaluation of Sample Nos. 11–14 are as follows in Table 8.

TABLE 8

| Sample No. | Evaluation |
|---|---|
| 11. | Very slight blanching detected. No blistering detected. |
| 12. | No blanching detected. No blistering detected. |
| 13. | Slight blanching detected. No blistering detected. |
| 14. | No blanching detected. No blistering detected. |

In comparing the evaluations of Table 5 and Table 8, it is clear that all of the Fluoroshield samples tested were significantly deteriorated and degraded by the Atlas cell test while none of the samples in accord with the present invention suffered any significant deterioration or degradation. Sample Nos. 13 and 14 were further tested, under the same corresponding conditions stipulated above in Table 8 for an additional 300 hours each. In all cases, the evaluation of these samples, after the additional 300 hour exposures, remained unchanged.

BOND STRENGTH DETERMINATIONS FOR SiC-CONTAINING E-CTFE COATINGS

The next group of examples illustrates the effect on bond strength between the coating and the underlying metal substrate by increasing the concentration of SiC in the primer coat layer.

Several additional sample plates (S–X) were fabricated wherein composites were formed on underlying mild steel substrates in accordance with the procedures described above with the following departures from the enumerated protocol. The workpieces to be coated were cleaned by a single grit blasting with 80 grit aluminum oxide (Step 6) and "baked" in an oven at 600° F. (Step 11). A primer coat was applied to workpieces brought to a temperature of about 500° F. (Step 12). Workpieces were returned to the oven and brought back up to 500° F. before application of each succeeding coat (Step 16). Coatings were applied before the workpiece cooled below 465° F. (Step 15).

All bond strength determinations were made according to ASTM D3167-76 (Reapproved 1981), entitled "Standard Test Method for Floating Roller Peel Resistance of Adhesives", with the exception that an equivalent to the fixture for supporting the test specimen, described in paragraph 4.2 of ASTM D3167-76, was used to the same end result.

In samples S–W, Ausimont's HALAR® 6014 ethylenechlorotrifluoroethylene copolymer (100% E-CTFE) was used as a primer coat resin with Norton Company's 39 Crystolon green silicon carbide flour 4647 (1000 grit) in admixture therewith in the amounts indicated in Table 9 below. The primer coat layer applied to each plate was followed by five ten-mil thick coats of neat, 100% E-CTFE, giving a total coating thickness of 53 to 55 mils.

In sample plate X, Ausimont's HALAR® 6614 E-CTFE primer system, believed to contain, as its major ingredient, E-CTFE, with chromium oxide as a minor additive, was first applied followed by five applications of AUSIMONT'S HALAR® 6014 neat E-CTFE top coat resin.

Sample plates were formed using ¼"×8"×8" size mild steel plates. The results of the bond strength testing are as follows in Table 9.

TABLE 9

| E-CTFE COATING BOND STRENGTH TESTING | | | | | | |
|---|---|---|---|---|---|---|
| Sample Plate | S | T | U | V | W | X |
| Primer Coat | | | | | | |
| E-CTFE[1] wt. % | 100 | 95 | 90 | 85 | 75 | N.D.[3] |
| SiC[2] wt. % | 0 | 5 | 10 | 15 | 25 | 0 |
| Particle Size | — | 5μ | 5μ | 5μ | 5μ | — |
| $Cr_2O_3$ wt. % | 0 | 0 | 0 | 0 | 0 | N.D.[3] |
| Thickness | approx. 3–5 mil (all) | | | | | |
| Top Coat | | | | | | |
| E-CTFE wt. % | 100 (all) | | | | | |
| Thickness | 50 mil (all) | | | | | |
| No. of layers | 5 (all) | | | | | |
| Peel strength (pli) | 60 | >180[4] | >134[4] | >110[4] | >104[4] | 75 |

[1]Ausimont HALAR ® 6014 E-CTFE resin.
[2]Norton Company 39 Crystolon green silicon carbide flour 4647, Worcester, Mass.
[3]Ausimont HALAR ® 6614 E-CTFE primer system, believed to consist of a major volume of E-CTFE and a minor amount of $Cr_2O_3$.

TABLE 9-continued

E-CTFE COATING BOND STRENGTH TESTING

| Sample Plate | S | T | U | V | W | X |
|---|---|---|---|---|---|---|

[4]Value shown is actually a measurement of the cohesive strength of the coating. Adhesive (bond) strength of the coating to the substrate believed to be considerably higher than cohesive strength value shown.

In sample plate S, coated with neat (0 wt. % SiC) E-CTFE in both the "primer" layer and top coat layers, bond strength between the "primer" coat layer and metal substrate was relatively low, around 60 pounds/linear inch (pli). Sample plate X, prepared with the manufacturer's recommended primer system, (HALAR® 6614 E-CTFE primer) believed to contain a minor amount of chromium oxide, fared slightly better than sample plate S, giving a bond strength between the primer coat layer and metal substrate of 75 pli, an improvement of about 25%.

In sample plate T, the addition of only 5 wt. % SiC to the primer coat resin resulted in a bond strength value in excess of 180 pli, better than a 300% improvement in bond strength over plate S; 240% over plate X coated with the manufacturer's recommended primer system. The actual bond strength of the sample plate T coating to the substrate could not be precisely determined because the strips of coating being peeled away from the substrate during testing ripped apart shortly after peeling was initiated. Thus, the value shown is actually a measure of the cohesive strength of the coating being peeled away from the substrate during the test.

In sample plates U, V, and W, having 10, 15 and 25 wt. % SiC, respectively, in admixture with the E-CTFE resin as the primer coat, the bond strength between the coating and metal substrate was, like sample plate T, so great that it exceeded the cohesive strength of the strip of coating being peeled away from the substrate. Thus the peel strength values expressed in Table 9 for plates T, U, V, and W reflect the cohesive strength of the resin coating itself; the adhesive strength of the coating to the substrate is believed to be substantially in excess of the cohesive strength.

The apparent decrease in bond strength in coatings having increased amounts of SiC, actually a decrease in the coating cohesive strength, not adhesive strength, is believed to be due to the increased brittleness of the primer coat layer brought about by the elevated SiC content. Thus, as the strip was peeled away from the substrate during the test, the more brittle, higher SiC-containing primer coat layer caused the strip of coating being peeled to tear more easily, the tear being initiated by a fracture in the brittle primer coat.

In an effort to determine an actual bond strength value for SiC-containing E-CTFE coatings, a sample plate having a coating corresponding to that applied to sample plate U was prepared, this time with a piece of metal screen embedded in the top coat layers. The screen, 6"×9" in dimension, was positioned over the 10 wt. % SiC-containing primer coat layer and the top coat layers applied over the screen in the same manner as described for the preparation of plate U. The screen was intended to provide a substantial reinforcement of the coating as it was being peeled away from the substrate. Despite the addition of the reinforcing screen in the strip of coating being peeled away from the substrate, the strip fractured, stretching the screen embedded in it, just after the point at which a value of 150 pli had been measured.

CORROSION-RESISTANCE DETERMINATION FOR SiC-CONTAINING E-CTFE COATINGS

In the examples which follow, the corrosion resistance of SiC-containing E-CTFE coatings is illustrated. Sample plate Y, corresponding to sample plate U described above, was prepared by applying a 3–5 mil thick primer coat layer of E-CTFE (HALAR® 6014) having 10 wt. % SiC admixed therewith, followed by five successive coats of E-CTFE (HALAR® 6014) having 2.5 wt. % SiC admixed therewith. A 10 wt. % SiC-containing E-CTFE primer coat layer was selected on the basis of the bond strength test results reported in Table 9 above and was deemed to represent a primer coat having a preferred bond strength. A 2.5 wt. % SiC-containing E-CTFE top coat was selected on the basis of the superior corrosion test results observed for 2 wt. % SiC-containing PFA top coat resins.

For purposes of comparison, sample plate Z was prepared in the same manner as sample plate X in Table 9 above, (one 3–5 mil primer layer coat of Ausimont HALAR® 6614 E-CTFE, believed to contain chromium oxide, followed by five successive 10 mil coats of neat E-CTFE (Ausimont HALAR® 6014)).

Both sample plates Y and Z were subjected to Atlas Cell testing as described above (20% HCl @220° F.) and observations of the respective coatings made at 300, 600 and 1000 hours. Prior to the Atlas cell testing, each plate was spark tested for pinholes in the coating by testing with a Wegener WEG 20 High Frequency Spark Tester set to 20 KV (AC). The power level at which spark testing was conducted was considerably more demanding of the coatings being tested than is recommended by the Society of Plastics Industry (SPI) Test Method for Detecting Faults in Corrosion Resistant Fluoropolymer Coating Systems, No. FD-118. SPI recommended test voltages do not exceed 6,000 volts (DC). No pinholes were detected in either plate spark tested. The results appear in Table 10 below.

TABLE 10

E-CTFE CORROSION RESISTANCE TESTING

| | Sample Plate | |
|---|---|---|
| Hours | Y | Z |
| 300 | no change | no change |
| 600 | small blister (3 mm) forming | no change |
| 1000 | small blister increasing in size (14 mm) and beginning to crack; second small blister (3 mm) forming | no change |

As Table 10 shows, SiC-containing E-CTFE barrier coatings were unaffected by exposure to hot (220° F.) 20% HCl even after exposure for 1000 hours.

In comparison, the AUSIMONT barrier coat system began to blister after 600 hours of exposure under the same acid conditions. Blistering suggests two modes of failure for the system: (1) permeation of the top coat layer by HCl and (2) insufficient bonding of the primer coat layer to the metal substrate (75 pli), permitting a direct chemical attack on the underlying metal substrate, lifting the coating, exacerbating coating failure. No failure was evident after 1000 hours of hot acid exposure in the SiC-containing E-CTFE system.

BOND STRENGTH DETERMINATION FOR ZrC-CONTAINING E-CTFE COATING

In this example, the bond strength of a 10 wt. % zirconium carbide-containing E-CTFE coating was determined. The zirconium carbide (Z-1034, a product of Zerac/Pure, Milwaukee, Wisc. 53233) was less than 44μ in particle size. Coating application and bond strength testing were carried out as described for SiC-containing E-CTFE. Bond strength was determined to be in excess of 190 pli, the value measured just prior to the cohesive failure of the strip of coating being peeled from the substrate.

BOND STRENGTH DETERMINATIONS FOR SiC-CONTAINING E-TFE COATINGS

The object of developing these samples was to determine the effect on bond strength between an ethylene-tetrafluoroetylene copolymer (E-TFE) coating and underlying metal substrate of adding SiC in increasing concentrations to the primer coat layer. Sample plates were prepared wherein E-TFE composite barrier coatings were formed on underlying mild steel substrates in accordance with the procedures described immediately above for E-CTFE with the exception that after grit blasting, workpieces were "baked" at 530° F. (Step 11) and the primer coat and all subsequent top coats applied with the workpiece at a temperature of 525° F. (Step 12).

In samples AA–EE, Dupont's TEFZEL® ethylene-tetrafluoroethylene copolymer (E-TFE) was used as a primer coat layer with Norton Company's 39 Crystolon green silicon carbide flour 4647 (1000 grit) in admixture therewith in the amounts indicated in Table 11 below.

TABLE 11

| E-TFE COATING BOND STRENGTH TESTING | | | | | |
|---|---|---|---|---|---|
| Sample Plate | AA | BB | CC | DD | EE |
| Primer Coat | | | | | |
| E-TFE[1] wt. % | 100 | 95 | 90 | 85 | 75 |
| SiC[2] wt. % | 0 | 5 | 10 | 15 | 25 |
| Particle Size | — | 5μ | 5μ | 5μ | 5μ |
| Thickness | 3–5 mil (all) | | | | |
| Top Coat | | | | | |
| E-TFE wt. % | 100% | | | | |
| Thickness (mils) | 27 | N.D. | 30 | 30 | 35 |
| No. of layers | 10 | N.D. | 10 | 10 | 10 |
| Peel Strength (pli) | 29 | N.D. | 28 | 31 | 37.5 |

[1]TEFZEL® 532-6000 ethylene-tetrafluoroethylene copolymer sold by Dupont.
[2]39 CRYSTOLON green silicon carbide flour 4647 of Norton Co.

From Table 11, bond strength between E-TFE and the metal substrate is observed to improve measurably with increased amounts of SiC. A 23% improvement over neat E-TFE is obtained by the addition of 25 wt. % SiC.

CORROSION-RESISTANCE DETERMINATION FOR SiC-CONTAINING E-TFE COATINGS

In the examples which follow, the corrosion resistance of SiC-containing E-TFE coatings is illustrated. Sample plate GG was prepared corresponding to sample plate EE above, that is, having a "primer" coat layer of 75 wt. % E-TFE/25 wt. % SiC and "top" coat layers of 95 wt. % E-TFE/5 wt. % SiC. For comparative purposes, sample plate FF, corresponding to sample plate AA above, was prepared having a neat E-TFE coating applied thereto.

E-TFE coatings applied to sample plates FF and GG and corrosion test results are summarized in Table 12 below.

TABLE 12

| E-TFE CORROSION-RESISTANCE TESTING | | |
|---|---|---|
| | FF | GG |
| Primer Coat | | |
| E-TFE wt. % | 100 | 75 |
| SiC wt. % | 0 | 25 |
| Thickness (mils) | 3–5 | 3–5 |
| Top Coat | | |
| E-TFE wt. % | 100 | 95 |
| SiC wt. % | 0 | 5 |
| Thickness (mils) | 37 | 40 |
| No. of Coats | 10 | 6 |
| Corrosion Test | | |
| 300 hours | no change | no change |
| 600 hours | no change | no change |
| 1000 hours | test area has developed hundreds of pin holes throughout due to the extensive cracking of the exposed coating surface | a single pinhole has developed in the coating |

After 1000 hours of hot acid (20% HCl at 220° F.) exposure, the neat E-TFE coating of sample plate FF was literally riddled with pinholes (2–3 pinholes/cm$^2$) with extensive discrete micro-cracks throughout, each crack about 3 mm or so in length. In comparison, the SiC-containing E-TFE coating of sample plate GG developed a single pinhole and no evidence of any cracking after 1000 hours of hot acid exposure. Pinholes were detected using a WEG 20 Wegener High Frequency Spark Tester set to 20 KV (AC).

In addition to the superior corrosion-resistance of the SiC-containing E-TFE coating, the admixture of SiC was seen to reduce shrinkage of the coating applied. On a scale of 1 to 5 (1 being no visible coating shrinkage and the coating is observed to flow smoothly around the sample plate edge without thinning; 5 being severe coating shrinkage and the coating is observed to form shrinkage ridges pulled in over ¼" from the edge of the sample plate), neat E-TFE coatings experienced severe shrinkage, for a rating of 5, while shrinkage of 95 wt. % E-TFE/5 wt. % SiC coatings (applied over a 3–5 mil primer coat of 75 wt. % E-TFE/25 wt. % SiC) was very low, for a rating of 2 (slight shrinkage—just starting to thin or pull in at the corners).

Further, the addition of SiC was seen to improve surface uniformity of the applied coating. Neat E-TFE coatings tended to be uneven with large bumps and waves unevenly distributed across the coating surface, giving a mottled effect, whereas the addition of only 5 wt. % SiC rendered E-TFE coat smooth and uniform. High surface gloss of E-TFE coatings remained unaffected by the addition of SiC.

Still further, the addition of SiC to E-TFE was seen to improve the "buildability" of the electrostatically applied coating. Ten coats of neat E-TFE were required to achieve a 37 mil thick top coat whereas only 6 coats of 5 wt. % SiC containing E-TFE were required to achieve a 40 mil thick top coat, an improvement over nearly 180% (6.6 mils/coat vs. 3.7 mils/coat). The phenomenon observed appears to reside in the amount of dry E-TFE powder that will adhere to the sample plate during electrostatic deposition. SiC-containing E-TFE dry powder was observed to build to a greater depth than neat E-TFE dry powders. A possible explanation for the observed phenomenon may be that the negatively charged resin powder insulates the relatively positively (i.e. grounded) charged piece being electrostatically coated. Once insulated, the charged workpiece cannot attract additional powder and, in fact, additional powder sprayed on the piece is repelled or simply falls away. The addition of SiC to the resin powder may improve the powder conductivity, thereby permitting a thicker layer of dry resin powder to be attracted to the substrate before reaching a thickness great enough to insulate the underlying substrate.

Overall, the addition of SiC to E-TFE coatings was seen to improve coating bond strength, dramatically improve corrosion resistance, markedly reduce coating shrinkage, significantly improve surface uniformity, and provide nearly a two-fold improvement in "buildability".

CORROSION-RESISTANCE DETERMINATION FOR SiC-CONTAINING PVDF COATINGS

In the following examples, the corrosion resistance of SiC-containing poly(vinylidene fluoride) (PVDF) top coats applied over a $Cr_2O_3$-containing PVDF "primer" coat is illustrated. Sample plates HH and II were coated according to the procedures already described for E-CTFE with the exception that after grit blasting, the plates were "baked" at 550° F. (Step 12). Between subsequent coating applications, the plates were returned to 500° F. Top coatings were applied before the plates cooled below 350° F. (Step 15).

A 3–5 mil thick primer coat of KF Polymer poly(vinylidene fluoride) (PVDF), a Kreha Corporation of America product, admixed with 5 wt. % chromium oxide (Cerac, Inc., Milwaukee, Wisc.), was applied to both sample plates tested. To sample plates HH and II, were applied top coats of PVDF resin having in admixture therewith 0 and 5 wt. % SiC respectively.

Plates HH and II were concurrently subjected to Atlas cell testing (20% HCl at 220° F.) and observations of the coatings made at 300, 600 and 1000 hour intervals. Each plate was spark tested at 20 KV (AC) and found free of pinholes. Results of Atlas cell tests are summarized in Table 13 below.

TABLE 13

| CORROSION-RESISTANCE DETERMINATION FOR PVDF | | |
|---|---|---|
| Sample Plate | HH | II |
| Primer Coat | | |
| PVDF[1] wt. % | 95 | 95 |
| $Cr_2O_3$ wt. % | 5 | 5 |
| Particle Size | ≦10μ | ≦10μ |
| Thickness | 3–5 mils | 3–5 mils |
| Top Coat | | |
| PVDF wt. % | 100 | 95 |
| SiC | 0 | 5 |
| Particle Size | — | 5μ |
| No. of layers | 3 | 4 |
| Thickness (mil) | 45 | 50 |
| Atlas Cell Test | | |
| 300 | large (11 mm) blister formed | very small (4 mm) blister beginning to form |
| 600 | blister enlarged | blister |

TABLE 13-continued

| CORROSION-RESISTANCE DETERMINATION FOR PVDF | | |
|---|---|---|
| Sample Plate | HH | II |
| 1000 | to 15 mm causing disbonding in area blister continues to enlarge (23 mm); pinhole in blister formed. | enlarged to 6 mm pinhole developed in 6 mm blister |

[1]PVDF KF Polymer poly(vinylidine)fluoride, Kreha Corporation of America.
[2]$Cr_2O_3$, Cerac, Inc., P.O. Box 1178, Milwaukee, Wisconsin 53201

As Table 13 shows, sample plate II, having a 5 wt. % SIC/95 wt. % PVDF top coat, was much less susceptible to blistering than sample plate HH having a neat PVDF top coat. The addition of SiC to the PVDF top coat significantly reduced permeation by hot HCl (20% HCl @220° F.) as evidenced by the greatly reduced extent of blistering, notwithstanding the use of a $Cr_2O_3$-containing "primer" coat layer of PVDF.

BOND STRENGTH DETERMINATION FOR SiC AND/OR HIGH PERFORMANCE THERMOPLASTIC-CONTAINING PFA COATING

In the examples which follow, sample plates MM, NN, OO, PP, QQ, RR and SS were prepared in order to compare bond strengths for PFA resin coatings having 0, 10 and 20 wt. % SiC; 20 wt. % polyphenylene sulfide (PPS); 20 and 15 wt. % polyetheretherketone (PEEK); and 10 wt. % SiC in admixture with 20 wt. % PEEK. All samples were prepared in the same manner described earlier for PFA coatings. Bond strength data for each are presented in Table 14 below.

TABLE 14

| PFA COATING BOND STRENGTH TESTING | | | | | | | |
|---|---|---|---|---|---|---|---|
| Primer Coat | MM | NN | OO | PP | QQ | RR[7] | SS |
| PFA[1] | 100% | 90 | 80 | 80 | 80 | 85 | 70 |
| SiC[2] | 0 | 10 | 20 | 0 | 0 | 0 | 10 |
| PPS[3] | 0 | 0 | 0 | 20 | 0 | 0 | 0 |
| PEEK[4] | 0 | 0 | 0 | 0 | 20 | 15 | 20 |
| Thickness (# coats/mil) | 4/19 | 4/21 | 4/19 | 4/33 | 4/31 | 3/23 | 4/26 |
| Bond Strength | <5 | 10–15 | <5 | <5 | >40[5] | N.D.[6] | N.D.[6] |

[1]PFA (perfluoroalkoxy resin), NEOFLON AC-5500 PFA resin, Daikin Industries, Osaka, Japan.
[2]SiC (green silicon carbide flour) 39 CRYSTOLON 4647 (1000 grit) Norton Company, Worcester, Mass.
[3]PPS (polyphenylene sulfide resin) Ryton type V-1; Philips Chemical Co., Bartlesville, Oklahoma.
[4]PEEK (polyetheretherketone) Victrex ® 150 PF, Batch No. SP69-191P, ICI Americas, Inc., Wilmington, Delaware 19897.
[5]exceeded cohesive strength of coating.
[6]bond strength too great to initiate peeling.
[7]Plate RR was Atlac cell tested for corrosion resistance (70 wt. % nitric acid at 225° F.) and, after 300 hours of testing, shows no evidence of pinholes or blistering.

In comparing bond strength of PFA with the various additives above indicated, it is clear that 20 wt. % PEEK provides at least an 800% increase in bond strength over neat coatings, 20 wt. % PPS and 20 wt. % SiC-containing PFA "primer" coatings, and a 3 to 4 fold increase over a 10 wt. % SiC-containing PFA "primer" coating.

In the above described examples, microscopic examination of PPS and PEEK-containing PFA coatings shows that PPS remains, for the most part, in its particulate state as discrete spheres in the PFA resin. Where PPS particles are in direct contact with the metal substrate, there is some evidence of PPS flow at the point of contact.

PEEK particles, on the other hand, in the involved examples appear to flow to a greater extent at their point of contact with the metal substrate, appearing as rounded mounds rising from the substrate. PEEK particles not in contact with the substrate form interconnected strings, anchored to the mounds, and form a matrix through which the PFA resin flows.

Coating composites of about 10 to about 40 wt. % PEEK/about 90 to about 60 wt. % PFA "primer" coat and about 2 wt. % SIC/98 wt. % PFA top coat provide a superior barrier resistant coating resulting from the vastly superior bond strength of the PEEK-containing PFA "primer" system and the corrosion resistance previously demonstrated for a 2 wt. %-containing PFA "top coat".

In Table 14A below, bond strengths and Atlas Cell test results are presented for such composite coatings. The sample plates TT, UU, VV, WW, XX, and YY were prepared by applying 5 coats of a "primer" coating composition of PFA resin and 5, 10, 20 and 40 wt % PEEK or 8 wt % PPS, and 5 coats of a "top coat" composition including PFA resin and 2 wt % SiC. All samples were prepared in the same manner described earlier for PFA coatings.

TABLE 14A

COMPOSITE COATINGS
BOND STRENGTH AND ATLAS CELL TEST RESULTS

| | Sample | | | | | |
|---|---|---|---|---|---|---|
| | TT | UU | VV | WW | XX | YY |
| Primer Coat | | | | | | |
| PFA[1] | 95 | 90 | 80 | 80 | 60 | 0 |
| PFA[2] | 0 | 0 | 0 | 0 | 0 | 92 |
| PEEK[3] | 0 | 0 | 20 | 0 | 40 | 0 |
| PEEK[4] | 5 | 10 | 0 | 20 | 0 | 0 |
| PPS[5] | 0 | 0 | 0 | 0 | 0 | 8 |
| Thickness (# coats/mil) | 10/36 | 10/42 | 10/41 | 10/39 | 10/36 | 10/43 |
| Bond Strength | 24 | 38 | >40 | >40 | >40 | 33[6] |
| Corrosion Resistance[7] | | | | | | |
| (500 hrs) | OK[8] | OK | OK | OK | OK | OK |
| (1000 hrs) | OK | OK | OK | OK | NO[9] | NO |

[1]PFA (perfluoroalkoxy resin), NEOFLON AC-5500 PFA resin, Daikin Industries, Osaka, Japan.
[2]PFA (perfluoroalkoxy resin), NEOFLON AC-5600 PFA resin, Daikin Industries, Osaka, Japan.
[3]PEEK (polyetheretherketone) Victrex ® 150 PF, Batch No. SP69-191P, ICI Americas, Inc., Wilmington, Delaware 19897.
[4]PEEK (polyetheretherketone) Victrex ® 450 PF, ICI Americas, Inc., Wilmington, Delaware 19897.
[5]PPS (polyphenylene sulfide resin) Ryton type V-1; Philips Chemical Co., Bartlesville, Oklahoma.
[6]Lower and higher concentrations of PS result in lower bond strength.
[7]Atlas cell testing conditions for corrosion resistance (70 wt. % nitric acid at 252° F.).
[8]Indicates slight blanching but no blistering was detected.
[9]Indicates that slight blanching and either blistering or disbonding was detected.

PREPARATION OF SiC-CONTAINING PFA SHEETS

The object of the example which follows was to demonstrate the preparation of a sheet of SiC-containing PFA resin.

The sheet was formed on a mild steel plate which had been cleaned according to the procedures described above, including grit blasting with 80 grit aluminum oxide grit, vacuum cleaning and baking in an oven for eight hours to drive contaminants from the steel. The surface of the cleaned plate was first sprayed with a heat stable release agent (Frekote 33, a fluoropolymer product manufactured by Frekote, Inc. of 170 W. Spanish River Blvd., Boca Raton, Fla. 33431) to permit a subsequently applied resin coating to be stripped cleanly away from the underlying substrate, then heated in an oven to between 680°–700° F. The heated, release agent-treated plate was then sprayed with six 8 to 10 mil thick coats of a 2 wt. % SIC/98 wt. % PFA dry powder mixture to give a total coating thickness of 60 mils. The plate was reheated to 680°–700° F. between each coat. After the final coat was applied, the coated metal plate was allowed to cool to ambient temperature and the coating stripped cleanly away from the substrate in the form of a sheet.

Continuous sheet production is contemplated through the use of endless thin steel belts, treated with a suitable release agent, heated between resin coating applications by passing the belts through a series of ovens heated, for example, by both convection and infrared radiation, the resin compositions being applied through spray nozzles spaced between ovens. Stainless steel belts, 18 to 24 gauge thick, manufactured by Sandvik Co. of 1702 Nevins Road, Fair Lawn, N.J. 07410 would be suitable for this purpose.

PREPARATION OF SHAPED ARTICLES
ARTICLES OF SiC-CONTAINING PFA

The object of the example which follows was to demonstrate the preparation of a shaped article comprised of a resin/ceramic powder mixture of the present invention.

In this example, a 3" pipe elbow having a 50 mil wall thickness and comprised of 98 wt. % PFA/2 wt. % SiC was prepared from a two-part mold assembled from a 3" carbon steel pipe elbow, cut in half along its length. The inside surface of each pipe half was grit blasted with 80 grit aluminum oxide, the residue removed and the pipe halves baked in an oven for eight hours at 760° F. to remove contaminants. After cooling the pipe halves to room temperature, they were re-assembled and the interior thereof coated with a release agent (Frekote 33) and the liquid excess removed.

The release agent-treated mold was returned to the oven and brought to a temperature of between 680° and 700° F. after which the mold was removed from the oven and the interior thereof electrostatically sprayed with the 98 wt. % PFA/2 wt. % SiC dry powder to form a coating thereon 8 to 10 mils thick. The thus-coated mold was returned to the oven and again heated to 680°–700° F. until the resin/SiC powder had fused to a smooth and glossy film. The coating process was repeated until the coating was 50 mils thick. After cooling, the molded piece was tested for pinholes using a WEG 20 spark tester set to 50 KV (AC). No pinholes were detected. The mold was disassembled and the PFA/SiC 3" elbow removed from the mold.

It is contemplated that the fluorocarbon polymer/additive coatings can be used in a variety of applications including those for which wear and load resistance, corrosion resistance, and/or release characteristics is desired.

For example, composite coatings of the present invention may be applied to the chemical seal and drive portion of agitators commonly employed in chemical vessels for mixing corrosive chemicals. Particularly useful in this regard are polyether/fluorocarbon polymer composites described above. Such composite coatings may also be applied to the tips of blades of such agitators which are subject to high abrasion and wear.

Still further, composites of the present invention may be applied as coatings to metal roll surfaces of the type found on rollers used in paper making, calendaring, and extrusion lamination, which rollers are usually subjected to abrasion, wear, and high load.

Many of the conventional primer systems used with the application of fluorinated polymer coatings to metal substrates, include chemicals, such as for example chromic oxide, which are considered detrimental to the environment and definitely are not approved for use with food stuffs for human consumption. On the other hand PFA, PPS, and PVDF, PES and silicon carbide have been approved by the U.S. Food and Drug Administration as coating materials which can be used in the processing of food stuffs for human consumption. Such approval has likewise been given to many of the species of crystalline ceramics. Thus, the use of the barrier coating system of the present invention and the composites formed therewith exhibit an additional advantage wherein applied to process equipment used in the preparation of such food stuffs.

What is claimed is:

1. An article having thereon a coating comprising the fused product of:
   (A) a primer coat directly in contact with the surface of the article, the primer coat comprising a polyether resin; and
   (B) at least one top coat overlying the primer coat, the top coat comprising a fluorocarbon resin and an additive comprising: a poly(phenylene sulfide) (PPS); or an inorganic crystalline ceramic powder, or a mixture thereof.

2. An article according to claim 1 wherein said polyether resin is polyethersulfone resin (PES).

3. An article according to claim 1 wherein said polyether resin is polyether ketone resin (PEK).

4. An article according to claim 1 wherein said polyether resin is polyether ether ketone resin (PEEK).

5. An article according to claim 1 wherein said additive includes a mixture of PPS and inorganic crystalline ceramic powder.

6. An article according to claim 1, 2, 3 or 4 wherein said additive is said PPS.

7. An article according to claim 1, 2, 3, or 4 wherein said additive is said inorganic crystalline ceramic powder.

8. An article according to claim 1 wherein said fluorocarbon resin consists essentially of perfluoroalkoxy tetrafluoroethylene copolymer resin (PFA).

9. An article according to claim 7 wherein said powder consists essentially of a metal carbide.

10. A composition according to claim 9 wherein said metal carbide consists essentially of silicon carbide, zirconium carbide, tungsten carbide, or boron carbide.

11. A composition according to claim 9 wherein said metal carbide consists essentially of silicon carbide.

12. A composition according to claim 1 wherein the particle size of said polyether resin is about 1 to about 200 microns and the particle size of said additive does not exceed that of said polyether resin.

13. A composition according to claim 12 wherein the particle size of said polyether resin is about 20 to about 120 microns.

14. An article according to claim 1 wherein said top coat comprises about 1 to about 40 wt. % of said additive.

15. An article according to claim 1 wherein said top coat comprises about 1 to about 25 wt. % of said additive.

16. An article according to claim 1 wherein said top coat comprises about 2 to about 5 wt. % of said additive.

17. An article having thereon a coating in the form of an adherent solid cohesive and nonporous material at ambient pressure, said coating comprising the fused product of:
   (A) a primer coat directly in contact with the surface of the article, the primer coat comprising a major amount of polyether resin; and
   (B) a top coat overlying the primer coat, the top coat comprising:
     (i) a major amount of fluorocarbon resin selected from the group consisting of (1) perfluoroalkoxytetrafluoroethylene copolymer resin (PFA), (2) ethylene-chlorotrifluoroethylene copolymer resin (E-CTFE), (3) ethylene-tetra-fluoroethylene copolymer resin (E-TFE), (4) poly(vinylidine fluoride) resin (PVDF), (5) tetrafluoroethylene-hexafluoropropylene copolymer resin (FEP), (6) poly(chlorotrifluoroethylene) resin (CTFE), and a mixture of two or more of said fluorocarbon resins; and
     (ii) an additive selected from the group consisting of poly(phenylene sulfide) (PPS) and a ceramic material and a mixture thereof.

18. The article of claim 17, wherein said base coat consists essentially of a polyether resin.

19. The article of claim 17, wherein said fluorocarbon resin consists essentially of PFA.

20. The article of claim 17, wherein said polyether resin contains PEEK.

21. The article of claim 17, wherein said top coat comprises about 1 to about 25 wt. % of said additive.

22. The article of claim 17, wherein said additive comprises about 0.5 to about 5 wt. % SIC.

23. The article of claim 17, wherein the primer coat is adhered to a metallic surface.

24. The article of claim 17, wherein said coating further comprises an additional top coat overlying said top coat and comprising a fluorocarbon resin of (B)(i) and silicon carbide.

25. The article of claim 17, wherein said primer coat consists essentially of a polyether resin, and said top coat comprises PFA, PVDF, E-CTFE or E-TFE.

* * * * *